(12) United States Patent
Coffland

(10) Patent No.: US 9,217,528 B1
(45) Date of Patent: Dec. 22, 2015

(54) APPARATUS AND SYSTEM FOR ENGAGING AND DISENGAGING QUICK-RELEASE COUPLINGS

(71) Applicant: The Boeing Company, Chicago, IL (US)

(72) Inventor: Donald W. Coffland, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 351 days.

(21) Appl. No.: 13/738,205

(22) Filed: Jan. 10, 2013

(51) Int. Cl.
  *B25B 27/14* (2006.01)
  *F16L 37/08* (2006.01)
  *F16L 13/00* (2006.01)
  *F16L 37/34* (2006.01)

(52) U.S. Cl.
  CPC ............... *F16L 37/08* (2013.01); *F16L 13/00* (2013.01); *F16L 37/34* (2013.01)

(58) Field of Classification Search
  USPC ........................................................ 29/278
  See application file for complete search history.

(56) References Cited

U.S. PATENT DOCUMENTS

| | | | | |
|---|---|---|---|---|
| 2,952,482 A * | 9/1960 | Torres | ............................. | 285/313 |
| 3,245,423 A * | 4/1966 | Hansen et al. | .................... | 137/74 |
| 4,088,436 A * | 5/1978 | Alferes | ............................ | 431/21 |
| 4,150,691 A * | 4/1979 | Maldavs | .................... | 137/614.03 |
| 4,181,150 A * | 1/1980 | Maldavs | .................... | 137/614.06 |
| 4,222,593 A * | 9/1980 | Lauffenburger | ................ | 285/85 |
| 4,290,440 A * | 9/1981 | Sturgis | ............................ | 137/75 |
| 4,394,874 A * | 7/1983 | Walter | ...................... | 137/614.02 |
| 4,398,561 A * | 8/1983 | Maldavs | ................... | 137/614.05 |
| 4,613,112 A * | 9/1986 | Phlipot et al. | ............... | 251/149.6 |
| 4,682,795 A * | 7/1987 | Rabushka et al. | .................. | 285/1 |
| 4,691,941 A * | 9/1987 | Rabushka et al. | .................. | 285/1 |
| 4,905,733 A * | 3/1990 | Carow | ...................... | 137/614.04 |
| 4,915,351 A * | 4/1990 | Hoffman | ..................... | 251/149.1 |
| 4,962,682 A * | 10/1990 | Rose et al. | ..................... | 81/177.85 |
| 5,080,132 A * | 1/1992 | Manz et al. | ............... | 137/614.04 |
| 5,172,723 A * | 12/1992 | Sturgis | ............................ | 137/613 |
| 5,316,033 A * | 5/1994 | Schumacher et al. | ......... | 137/614 |
| 5,388,874 A * | 2/1995 | Barrier | ............................ | 285/315 |
| 5,540,250 A | 7/1996 | Mullins | | |
| 5,782,171 A * | 7/1998 | Crain et al. | ....................... | 99/408 |
| 5,944,362 A * | 8/1999 | Harle | ........................ | 285/148.14 |
| 5,988,697 A * | 11/1999 | Arosio | ......................... | 285/124.1 |
| 6,158,717 A * | 12/2000 | Van Scyoc et al. | ......... | 251/149.6 |
| 6,196,265 B1 * | 3/2001 | Horton et al. | .................. | 137/614 |

(Continued)

FOREIGN PATENT DOCUMENTS

| | | | | |
|---|---|---|---|---|
| EP | | 1657481 A2 * | 5/2006 | |
| WO | WO 2013059748 A1 * | 4/2013 | | |

*Primary Examiner* — Lee D Wilson
*Assistant Examiner* — Alvin Grant
(74) *Attorney, Agent, or Firm* — Yee & Associates, P.C.

(57) ABSTRACT

A method and apparatus for connecting and disconnecting components of a quick-release coupling. A lever pivotably connected to a support structure configured to hold a first component of the quick-release coupling and a retractable component associated with the first component is rotated. The lever is configured to substantially align a second component of the quick-release coupling with a longitudinal axis through the first component. A retraction mechanism configured to retract the retractable component away from a receiving end of the first component is activated in response to the rotation of the lever. A coupling of the second component with the first component is controlled in response to the rotation of the lever and retraction of the retractable component.

20 Claims, 19 Drawing Sheets

(56) References Cited

U.S. PATENT DOCUMENTS

| | | | |
|---|---|---|---|
| 6,202,692 B1 * | 3/2001 | Schumacher | 137/614.06 |
| 6,354,564 B1 | 3/2002 | Van Scyoc et al. | |
| 6,722,701 B1 * | 4/2004 | Godinez | 285/1 |
| 6,935,614 B2 * | 8/2005 | Schneller et al. | 251/149.6 |
| 7,338,092 B1 * | 3/2008 | Cicconi, III | 285/305 |
| 8,025,048 B1 * | 9/2011 | Scarborough | 126/38 |
| 8,191,932 B2 * | 6/2012 | Davis | 285/316 |
| 8,303,000 B2 * | 11/2012 | Liu | 285/277 |
| 2006/0208481 A1 * | 9/2006 | Fischer et al. | 285/258 |
| 2010/0286791 A1 * | 11/2010 | Goldsmith | 623/23.7 |
| 2012/0090713 A1 * | 4/2012 | Cooley | 137/798 |

* cited by examiner

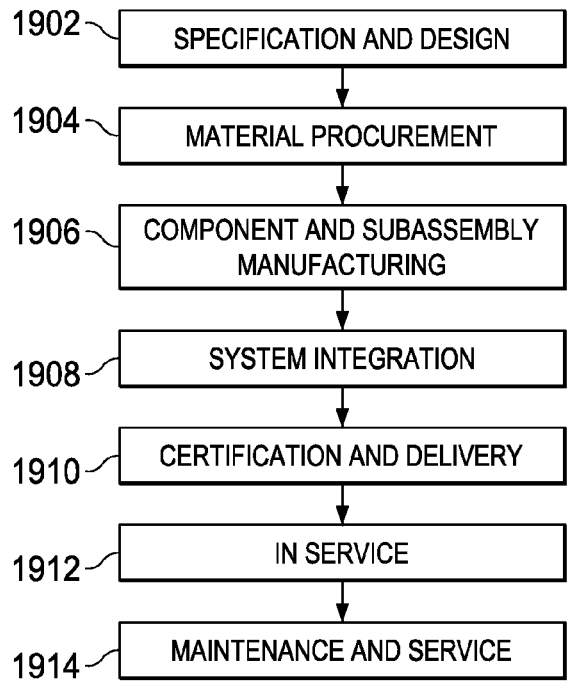
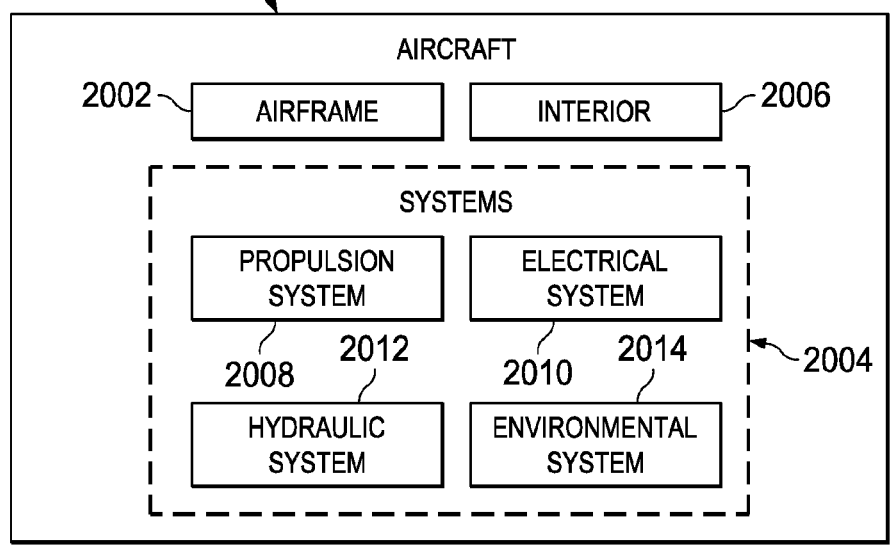

APPARATUS AND SYSTEM FOR ENGAGING AND DISENGAGING QUICK-RELEASE COUPLINGS

BACKGROUND INFORMATION

1. Field

The present disclosure relates generally to couplings and, in particular, to quick-release couplings. Still more particularly, the present disclosure relates to an apparatus, system, and method that use operation of a single lever to engage and/or disengage the components of a quick-release coupling.

2. Background

Quick-release couplings are used to couple fluid lines in various types of systems such as, for example, without limitation, fuel systems, hydraulic systems, pneumatic systems, and/or other types of fluid systems. Additionally, quick-release couplings may be used in various applications such as, for example, without limitation, electrical applications, mechanical applications, and other types of applications.

A quick-release coupling typically includes a first component, such as, but not limited to, a cylindrical socket, and a second component, such as, but not limited to a plug. Both the socket and the plug may have a channel that allows a flow of fluid. Insertion of the plug into the channel in the socket forms a coupling that connects the channel in the socket to the channel in the plug, thereby allowing fluid to flow between the socket and the plug.

Connection of the plug to the socket is enabled by a mechanism that includes locking balls positioned around the socket at openings in the socket. The openings have a smaller diameter than the diameter of the locking balls such that the locking balls do not completely fall into the channel within the socket. These openings form a ring around the end of the socket that receives the plug.

A retractable sleeve, typically spring-biased, is positioned around the socket over the locking balls. The sleeve holds the locking balls in place such that the locking balls are not allowed to move outward from the channel in the socket in the absence of external forces. When the sleeve is in an initial position in which the sleeve is not retracted, the locking balls prevent the plug from being inserted into the socket. In some cases, a human operator may push the plug into the socket to cause the balls to move outwards from the channel, which may, in turn, cause the sleeve to retract. Retraction of the sleeve releases the locking balls and allows the plug to move further into the socket.

The plug may have an annular groove that can receive the locking balls. As the plug is pushed into the channel in the socket, the locking balls may fall into this groove and engage the plug. Once the locking balls fall into this groove, the spring-biased sleeve returns to the initial position. In this manner, the plug may be connected to the socket. The plug and the socket may be disconnected from the socket in a similar manner by retracting the sleeve and pulling the plug out the socket. In this manner, the sleeve and the locking balls allow the plug to be quickly connected to and disconnected from the socket.

In certain situations, a human operator may need to manually retract the sleeve prior to pushing the plug into the socket. For example, a human operator may need to use one hand to retract the sleeve and the other hand to push the plug into the socket. However, with larger fluid lines and/or larger plugs and sockets, a second human operator may be needed. For example, a single human operator may not have the physical strength needed to both retract the sleeve and push the plug into the socket. Consequently, the first human operator may need to use both hands to hold the coupling and retract the sleeve, and the second human operator may need to use one or both hands to push the plug into the socket.

In some cases, a single human operator may not have the physical strength needed to retract the sleeve. For example, two human operators may be needed to retract the sleeve, and a third human operator may be needed to push the plug into the socket. In this manner, this type of manual process may require more effort and be more time-consuming than desired. Therefore, it would be desirable to have a method and apparatus that takes into account at least some of the issues discussed above, as well as other possible issues.

SUMMARY

In one illustrative embodiment, an apparatus comprises a support structure, a retraction mechanism, and a lever. The support structure comprises a first portion, a second portion, and a third portion. The first portion is configured to hold a first component. The second portion is configured to hold a second component in alignment with a longitudinal axis through the first component. The third portion is configured to hold a retractable component associated with the first component. The retraction mechanism is pivotably connected to the lever and to the third portion of the support structure. The lever is pivotably connected to the second portion of the support structure. Rotation of the lever moves the second component along the longitudinal axis and causes the retraction mechanism to retract the retractable component away from a receiving end of the first component.

In another illustrative embodiment, a coupling control system comprises a support structure, a lever, and a retraction mechanism. The support structure comprises a first bracket, a second bracket, and a third bracket. The first bracket is configured to hold a first component. The second bracket is configured to hold a second component in alignment with a longitudinal axis through the first component. The third bracket is configured to hold a retractable component associated with the first component. The lever is pivotably connected to the second bracket of the support structure. The retraction mechanism is pivotably connected to the lever and to the third bracket of the support structure. Rotation of the lever moves the second component along the longitudinal axis and causes the retraction mechanism to retract the retractable component away from a receiving end of the first component. Retraction of the retractable component away from the receiving end of the first component allows the second component to be one of connected to the first component and disconnected from the first component at the receiving end of the first component.

In yet another illustrative embodiment, a method is provided. A lever pivotably connected to a support structure configured to hold a first component and a retractable component associated with the first component is rotated. The lever is configured to substantially align a second component with a longitudinal axis through the first component. A retraction mechanism configured to retract the retractable component away from a receiving end of the first component is activated in response to the rotation of the lever. A coupling of the second component with the first component is controlled in response to the rotation of the lever and retraction of the retractable component.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 19 is an illustration of an aircraft manufacturing and service method in the form of a block diagram in accordance with an illustrative embodiment; and FIG. 20 is an illustration of an aircraft in the form of a block diagram in accordance with an illustrative embodiment.

DETAILED DESCRIPTION

The illustrative embodiments recognize and take into account different considerations. In particular, the illustrative embodiments recognize and take into account that it may be desirable to have a system that reduces the amount of effort and/or time needed to connect and disconnect the components of a quick-release coupling. The illustrative embodiments recognize and take into account that it may be desirable to have a system capable of connecting and disconnecting larger components of a quick-release coupling without requiring more than one human operator. Additionally, the illustrative embodiments recognize and take into account that a system that can be operated by a robotic system to connect and disconnect the components of a quick-release coupling may be desirable.

Thus, the illustrative embodiments provide an apparatus, system, and method for connecting and disconnecting the components of a quick-release coupling that uses the operation of a single lever by a human operator or a robotic operator. In one illustrative example, a coupling control system is provided for connecting and disconnecting the components of a quick-release coupling.

In this illustrative example, the coupling control system may comprise a support structure, a lever, and a retraction mechanism. The support structure comprises a first bracket, a second bracket, and a third bracket. The first bracket is configured to hold a first component of the quick-release coupling. The second bracket is configured to hold a second component of the quick-release coupling in alignment with a longitudinal axis through the first component. The third bracket is configured to hold a retractable component associated with the first component. The lever is pivotably connected to the second bracket of the support structure. The retraction mechanism is pivotably connected to the lever and to the third bracket of the support structure.

Rotation of the lever moves the second component along the longitudinal axis and causes the retraction mechanism to retract the retractable component away from a receiving end of the first component. Retraction of the retractable component away from the receiving end of the first component allows the second component to be one of connected to the first component and disconnected from the first component at the receiving end of the first component.

Figure 1:
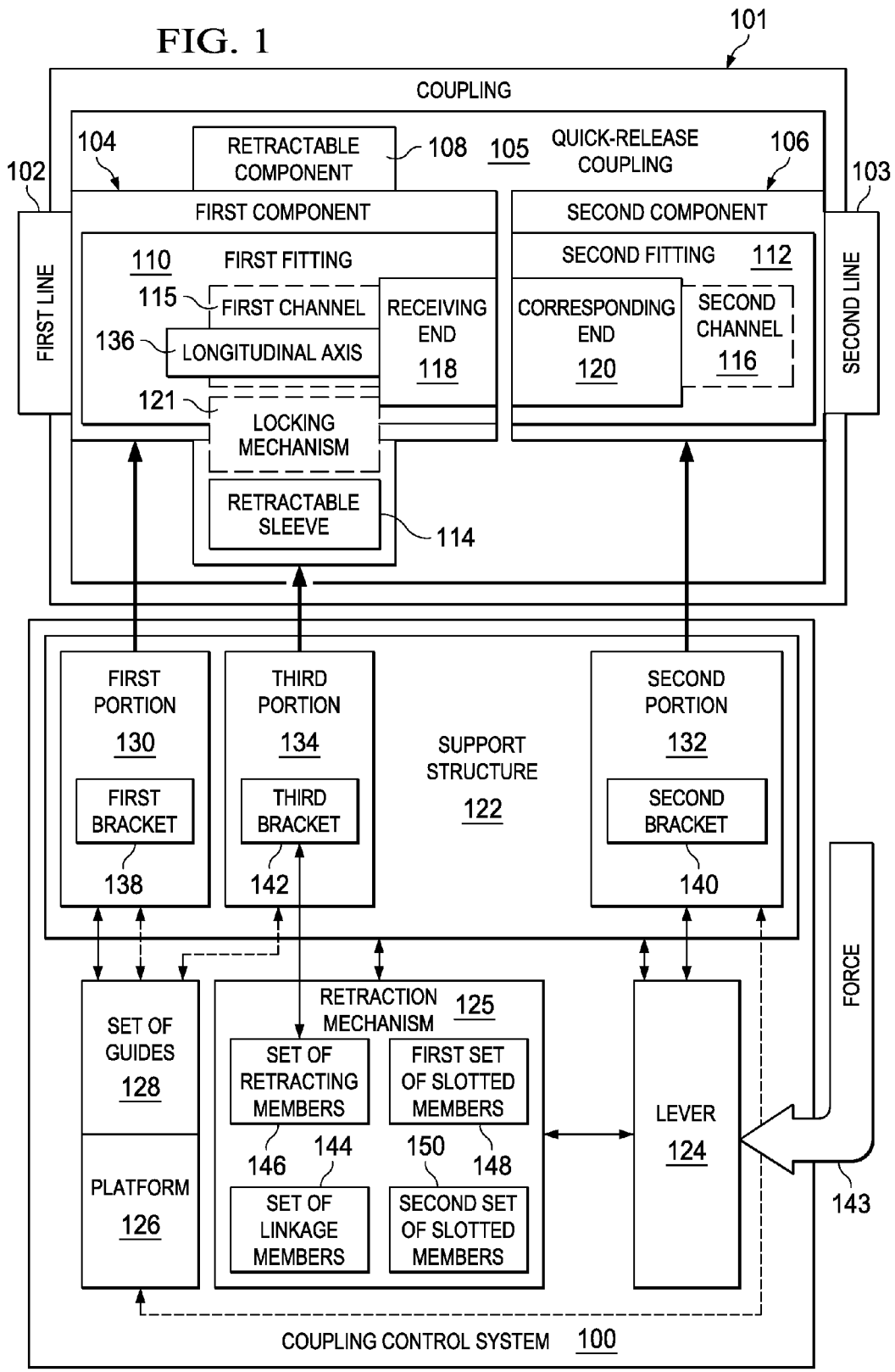
FIG. 1 is an illustration of a coupling control system in the form of a block diagram in accordance with an illustrative embodiment.

With reference now to FIG. 1, an illustration of a coupling control system in the form of a block diagram is depicted in accordance with an illustrative embodiment. In FIG. 1, coupling control system 100 may be used to connect and/or disconnect the components of coupling 101. When the components that form coupling 101 are connected, first line 102 may be coupled to second line 103. When the components that form coupling 101 are disconnected, first line 102 may be uncoupled from second line 103.

As used herein, a first component, such as first line 102, "coupled" to a second component, such as second line 103, means that the first component is connected to or fastened to the second component. This connection may be a direct connection or an indirect connection. For example, an end of first line 102 may be coupled to an end of second line 103 using coupling 101. As used herein, coupling 101 may be used to indirectly connect first line 102 to second line 103. In other words, the end of first line 102 and the end of second line 103 may not contact each other when these two ends are coupled by coupling 101.

In these illustrative examples, coupling 101 may be formed by first component 104 and second component 106. First component 104 may be associated with an end of first line 102, while second component 106 may be associated with an end of second line 103.

As used herein, when one object is "associated" with another object, the association is a physical association. For example, a first component, such as first component 104, may be considered to be associated with a second component, such as first line 102, by being secured to the second component, bonded to the second component, mounted to the second component, welded to the second component, fastened to the second component, and/or connected to the second component in some other suitable manner. In some cases, the first component may be connected to the second component using a third object. In other cases, the first component may be associated with the second component by being formed as part of and/or as an extension of the second component.

As depicted, coupling 101 also includes retractable component 108. Retractable component 108 may be associated with first component 104. For example, retractable component 108 may be positioned around first component 104 such that retractable component 108 surrounds first component 104.

In one illustrative example, coupling 101 may be formed by first component 104, second component 106, and retractable component 108 may take the form of quick-release coupling 105. Quick-release coupling 105 may be referred to as a quick-release connection in some cases. With quick-release coupling 105, first component 104 may take the form of first fitting 110, second component 106 may take the form of second fitting 112, and retractable component 108 may take the form of retractable sleeve 114.

In some cases, first fitting 110 and second fitting 112 may be referred to as quick-release fittings. Coupling control system 100 may be used to control the coupling of these quick-release fittings. In other words, coupling control system 100 may be used to control the connecting of these quick-release fittings and the disconnecting of these quick-release fittings.

Depending on the implementation, first fitting 110 may be a socket or some other type of component having a channel that extends through the component longitudinally. Second fitting 112 may be, for example, without limitation, a plug, an adaptor, or some other type of component configured to be inserted into first fitting 110. Retractable sleeve 114 may be, for example, without limitation, a tube, a hollow cylinder, or some other type of sleeve.

As depicted, first component 104 may have first channel 115 and second component 106 may have second channel 116. Second component 106 may be connected to first component 104 by inserting second component 106 into first channel 115 of first component 104 at receiving end 118 of first component 104. In particular, corresponding end 120 of second component 106 may be inserted into first channel 115 at receiving end 118 of first component 104. In this manner, first channel 115 and second channel 116 may be connected to each other. When connected, first channel 115 and second channel 116 together form a single continuous channel.

In this illustrative example, retractable component 108 may encircle a portion of first component 104 at receiving end 118. In some cases, retractable component 108 may be biased towards receiving end 118. As one illustrative example, retractable component 108 may be spring-biased towards receiving end 118 such that in the absence of external forces, retractable component 108 remains in an initial position at receiving end 118. However, retractable component 108 may be retracted away from receiving end 118 of first component 104 in a direction towards the opposite end of first component 104 using force.

Locking mechanism 121 may be associated with at least one of first component 104 and retractable component 108 in this illustrative example. Locking mechanism 121 prevents second component 106 from being connected to first component 104 unless retractable component 108 has been retracted to a selected position. Further, locking mechanism 121 prevents second component 106 from being disconnected from first component 104 unless retractable component 108 has been retracted to a selected position.

In this manner, when retractable component 108 has not been retracted to the selected position, locking mechanism 121 may remain in a locked state that prevents movement of second component 106 relative to first component 104. However, when retractable component 108 has been retracted to the selected position, locking mechanism 121 may enter an unlocked state in which second component 106 may be moved relative to first component 104.

In one illustrative example, locking mechanism 121 comprises a plurality of spherical bearings that are held in openings in first fitting 110 at receiving end 118 of first component 104. The spherical bearings may take the form of, for example, locking balls. These openings may have smaller diameters than the spherical bearings. In this manner, the spherical bearings may partially extend radially inwards into first channel 115 through the openings without falling through the openings.

In this illustrative example, locking mechanism 121 may also comprise a plurality of detents located on the inside of retractable component 108. In some cases, these detents may be referred to as cams. In the initial position, retractable component 108 may surround the spherical bearings and hold these spherical bearings in place. In particular, the spherical bearings may fit within the detents within retractable component 108. Retracting retractable component 108 at least to the selected retracted position releases the spherical bearings such that these spherical bearings are allowed to move. In other words, the retraction of retractable component 108 disengages locking mechanism 121 such that second component 106 may be connected to first component 104.

Coupling control system 100 may be used to both retract retractable component 108 and insert second component 106 into first channel 115 of first component 104 to connect second component 106 to first component 104. Further, coupling control system 100 may be used to both retract retractable component 108 and pull second component 106 away from first channel 115 of first component 104 to disconnect second component 106 from first component 104.

As depicted, coupling control system 100 may include support structure 122, lever 124, retraction mechanism 125, platform 126, and set of guides 128. As used herein, a "set of" items means one or more items. In this manner, set of guides 128 may be one or more guides.

In this illustrative example, support structure 122 may be configured to hold and support the various components that form quick-release coupling 105. Support structure 122 may include first portion 130, second portion 132, and third portion 134. In one illustrative example, first portion 130, second portion 132, and third portion 134 of support structure 122 take the form of first bracket 138, second bracket 140, and third bracket 142, respectively.

First portion 130 may be configured to hold and support first component 104. Second portion 132 may be configured to hold and support second component 106. Third portion 134 may be configured to hold and support retractable component 108. Further, support structure 122 holds second component 106 in alignment with longitudinal axis 136 through first component 104. Longitudinal axis 136 may be, for example, without limitation, a center axis through first channel 115 of first component 104.

First portion 130 may be fixedly associated with platform 126. Further, set of guides 128, which may be fixedly associated with platform 126, may be associated with first portion 130. Second portion 132 and third portion 134 may be moved translationally along set of guides 128 relative to first portion 130 by lever 124 and retraction mechanism 125. Set of guides 128 may be substantially parallel to longitudinal axis 136 through first component 104.

Lever 124 and retraction mechanism 125 are both pivotably connected to support structure 122. In one illustrative example, lever 124 is pivotably connected to second portion 132 of support structure 122.

As used herein, a first component, such as lever 124, that is "pivotably connected" to a second component, such as support structure 122, means that the first component may be pivoted, or rotated, about a connection point at which the first component is connected to the second component relative to the second component. In some cases, the second component may also be pivoted, or rotated, about this same connection point.

Further, retraction mechanism 125 is pivotably connected to lever 124. Retraction mechanism 125 may include set of retracting members 146, set of linkage members 144, first set of slotted members 148, and second set of slotted members 150. Each linking member in set of linkage members 144 may be pivotably connected to both lever 124 and a corresponding retracting member in set of retracting members 146. In this manner, set of linkage members 144 may link lever 124 to set of retracting members 146.

Each retracting member in set of retracting members 146 may be pivotably connected to third portion 134 of support structure 122. Further, each retracting member in set of retracting members 146 may be movably connected to a corresponding slotted member in first set of slotted members 148 and a corresponding slotted member in second set of slotted members 150.

As used herein, a first component, such as a retracting member in set of retracting members 146, that is "movably connected" to a second component, such as a slotted member in first set of slotted members 148, means that the first component may be configured to move relative to the second component. As one illustrative example, a retracting member may be movably connected to a slotted member by a fastener installed through the retracting member and a slot in the slotted member. The fastener may be allowed to move within the slot, which in turn, moves the retracting member relative to the slotted member.

First set of slotted members 148 and second set of slotted members 150 may be connected to first portion 130 of support structure 122. In some illustrative examples, first set of slotted members 148 and second set of slotted members 150 may be pivotably connected to first portion 130 of support structure 122.

As depicted, force 143 may be applied to lever 124 to operate lever 124. Force 143 may cause lever 124 to rotate. Rotation of lever 124 causes second portion 132 of support structure 122 connected to lever 124 to move along set of guides 128 substantially parallel to longitudinal axis 136. In particular, rotation of lever 124 towards first portion 130 of support structure 122 may cause second portion 132 of support structure 122 and second component 106 held by second portion 132 to move towards first portion 130. On the other hand, rotation of lever 124 away from first portion 130 of support structure 122 may cause second portion 132 of support structure 122 and second component 106 held by second portion 132 to move away from first portion 130.

Rotation of lever 124 may also cause retraction mechanism 125 to retract retractable component 108 away from receiving end 118 of first component 104. In particular, rotation of lever 124 may cause set of linkage members 144 to move. In particular, rotation of lever 124 may cause at least one of set of linkage members 144 to move at least one of rotationally and translationally. This rotational and/or translational movement of set of linkage members 144 may, in turn, cause set of retracting members 146 to at least one of rotate and move relative to at least one of first set of slotted members 148 and second set of slotted members 150. Rotation of set of retracting members 146 may cause retraction of retractable component 108.

Retraction of retractable component 108 allows second component 106 to be inserted into first channel 115 of first component 104 and/or pulled out of first channel 115 of first component 104, depending on the manner in which lever 124 is rotated. The manner in which rotation of lever 124 causes retraction mechanism 125 to retract retractable component 108 and either connects second component 106 to or disconnects second component 106 from first component 104 is described in greater detail below in FIGS. 9-16.

The illustration of coupling control system 100 and coupling 101 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, in some cases, connecting second component 106 to first component 104 may not require retracting retractable sleeve 114. Retracting retractable sleeve 114 may only be required for disconnecting second component 106 from first component 104 in these cases. Consequently, coupling control system 100 may be configured such that retraction mechanism 125 only retracts retractable sleeve 114 during the disconnecting of second component 106 from first component 104.

In some illustrative examples, coupling control system 100 may be configured to remain attached to coupling 101 while first component 104 and second component 106 are attached to each other. However, in other illustrative examples, coupling control system 100 may be configured to be detached from coupling 101 after second component 106 has been connected to first component 104.

Figure 2:
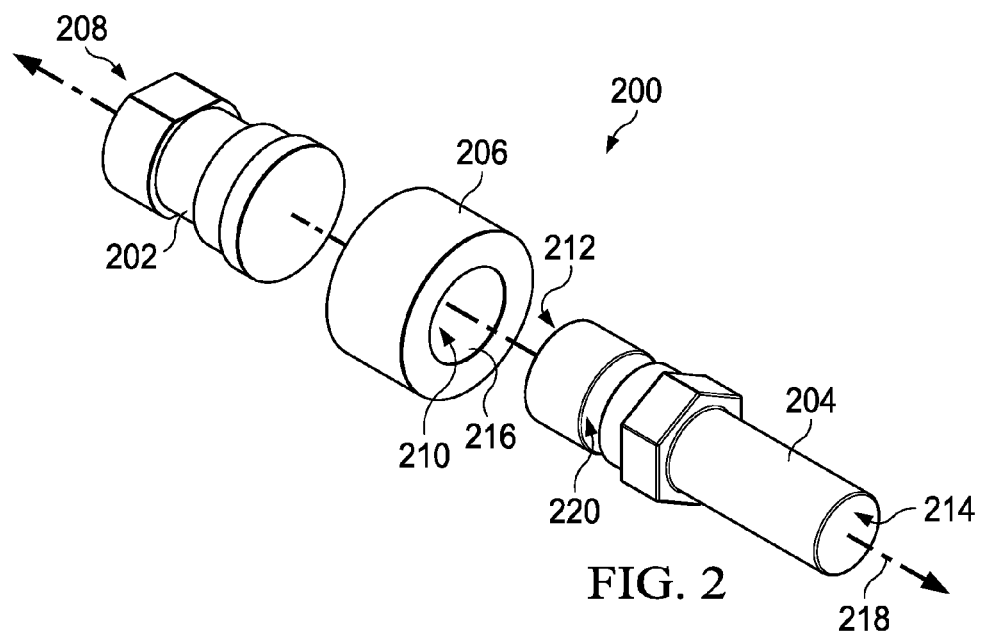
FIG. 2 is an illustration of an exploded isometric view of a quick-release coupling in accordance with an illustrative embodiment.

With reference now to FIG. 2, an illustration of an exploded isometric view of a quick-release coupling is depicted in accordance with an illustrative embodiment. In this illustrative example, quick-release coupling 200 is an example of one implementation for quick-release coupling 105 in FIG. 1.

As depicted, quick-release coupling 200 includes first fitting 202, second fitting 204, and retractable sleeve 206. First fitting 202, second fitting 204, and retractable sleeve 206 may be examples of implementations for first fitting 110, second fitting 112, and retractable sleeve 114, respectively, in FIG. 1.

First fitting 202 has end 208 and end 210. End 210 is a receiving end and is an example of one implementation for receiving end 118 in FIG. 1. Retractable sleeve 206 may be associated with first fitting 202 at end 210. In this illustrative example, retractable sleeve 206 may be a detent sleeve configured to hold a plurality of locking balls (not shown in this view) in place within openings that form a ring at receiving end 210 of first fitting 202.

Second fitting 204 may have end 212 and end 214. End 212 may be the corresponding end for end 210 of first fitting 202. End 212 may be an example of one implementation for corresponding end 120 in FIG. 1. In particular, second fitting 204 may be connected to first fitting 202 by inserting end 212 of second fitting 204 into channel 216 within first fitting 202 at receiving end 210 of first fitting 202. Channel 216 may be an example of one implementation for first channel 115 in FIG. 1.

As depicted, longitudinal axis 218 may be a center axis through first fitting 202. In this illustrative example, connecting second fitting 204 to first fitting 202 requires that second fitting 204 be substantially aligned with longitudinal axis 218. Longitudinal axis 218 may be an example of one implementation for longitudinal axis 136 in FIG. 1.

Further, second fitting 204 may have groove 220. Groove 220 is configured to receive the plurality of locking balls (not shown in this view) around first fitting 202 when second fitting 204 is connected to first fitting 202. As depicted, groove 220 is an annular groove.

Figure 3:
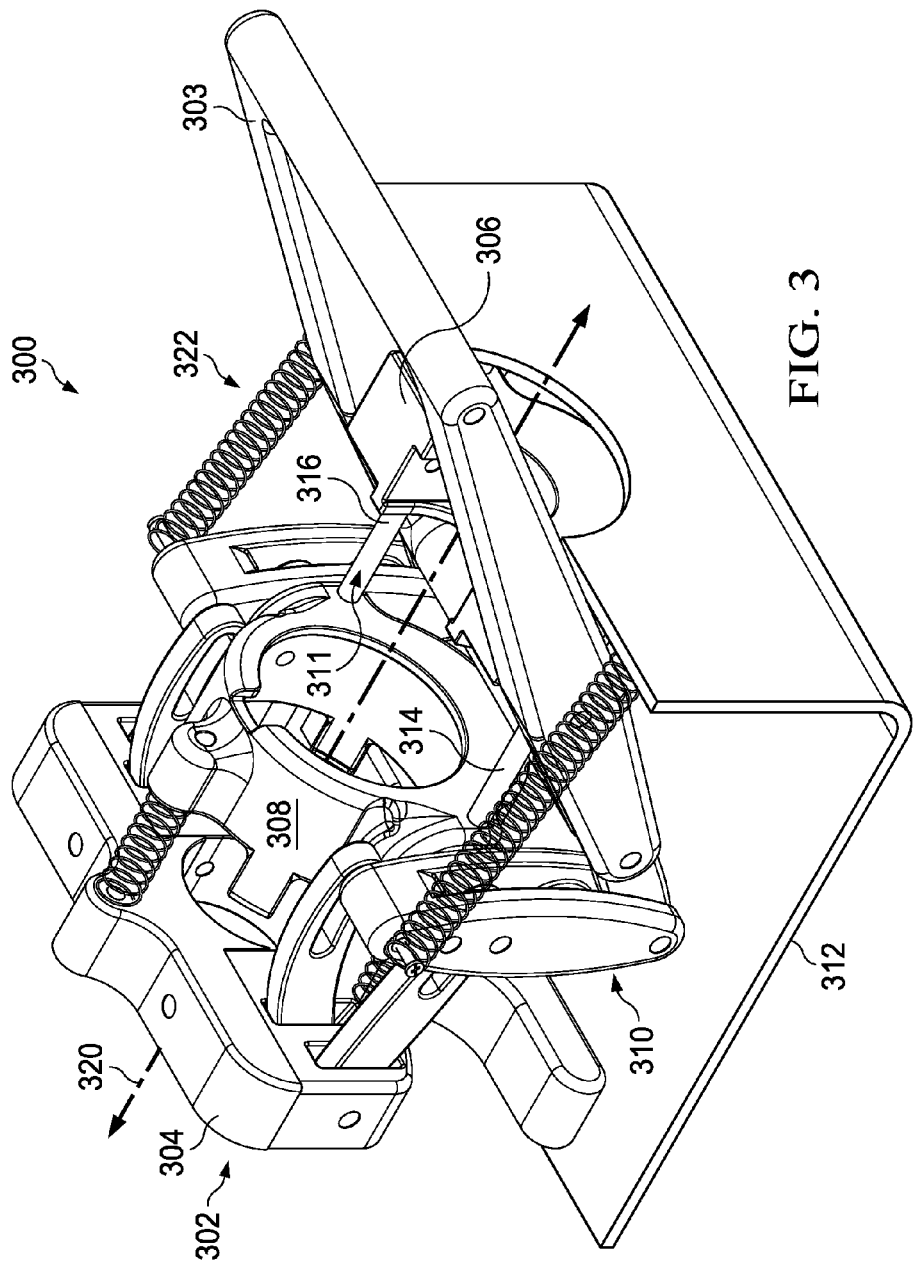
FIG. 3 is an illustration of an isometric side view of a coupling control system in accordance with an illustrative embodiment.

With reference now to FIGS. 3-8, illustrations of the various components of a coupling control system are depicted in accordance with an illustrative embodiment. Turning now to FIG. 3, an illustration of an isometric side view of a coupling control system is depicted in accordance with an illustrative embodiment. In FIG. 3, coupling control system 300 is an example of one implementation for coupling control system 100 in FIG. 1.

As depicted, coupling control system 300 includes support structure 302, handle 303, retraction mechanism 310, platform 312, and set of guides 311. Support structure 302 is an example of one implementation for support structure 122 in FIG. 1. As depicted, support structure 302 includes first bracket 304, second bracket 306, and third bracket 308. First bracket 304, second bracket 306, and third bracket 308 are examples of implementations for first bracket 138, second bracket 140, and third bracket 142, respectively, in FIG. 1. Support structure 302 is described in greater detail in FIG. 4 below.

Handle 303 is an example of one implementation for lever 124 in FIG. 1. Handle 303 is pivotably connected to second bracket 306. Retraction mechanism 310 is pivotably connected to both handle 303 and third bracket 308. Retraction mechanism 310 is an example of one implementation for retraction mechanism 125 in FIG. 1. Retraction mechanism 310 is described in greater detail in FIGS. 5-6 below. The manner in which handle 303 and retraction mechanism 310 may be operated is described in greater detail below in FIGS. 9-16.

First bracket 304 is fixedly connected to platform 312 in this illustrative example. Further, set of guides 311 is fixedly connected to platform 312 in this example. Platform 312 and set of guides 311 are examples of implementations for platform 126 and set of guides 128 in FIG. 1. In this illustrative example, set of guides 311 includes guide 314 and guide 316. Handle 303 may be operated to move second bracket 306 and/or third bracket 308 along set of guides 128 substantially parallel to longitudinal axis 320 relative to first bracket 304.

Additionally, in some cases, coupling control system 300 may include biasing system 322. Biasing system 322 may be comprised of a plurality of springs. Biasing system 322 may bias third bracket 308 towards and/or away from second bracket 306.

Figure 4:
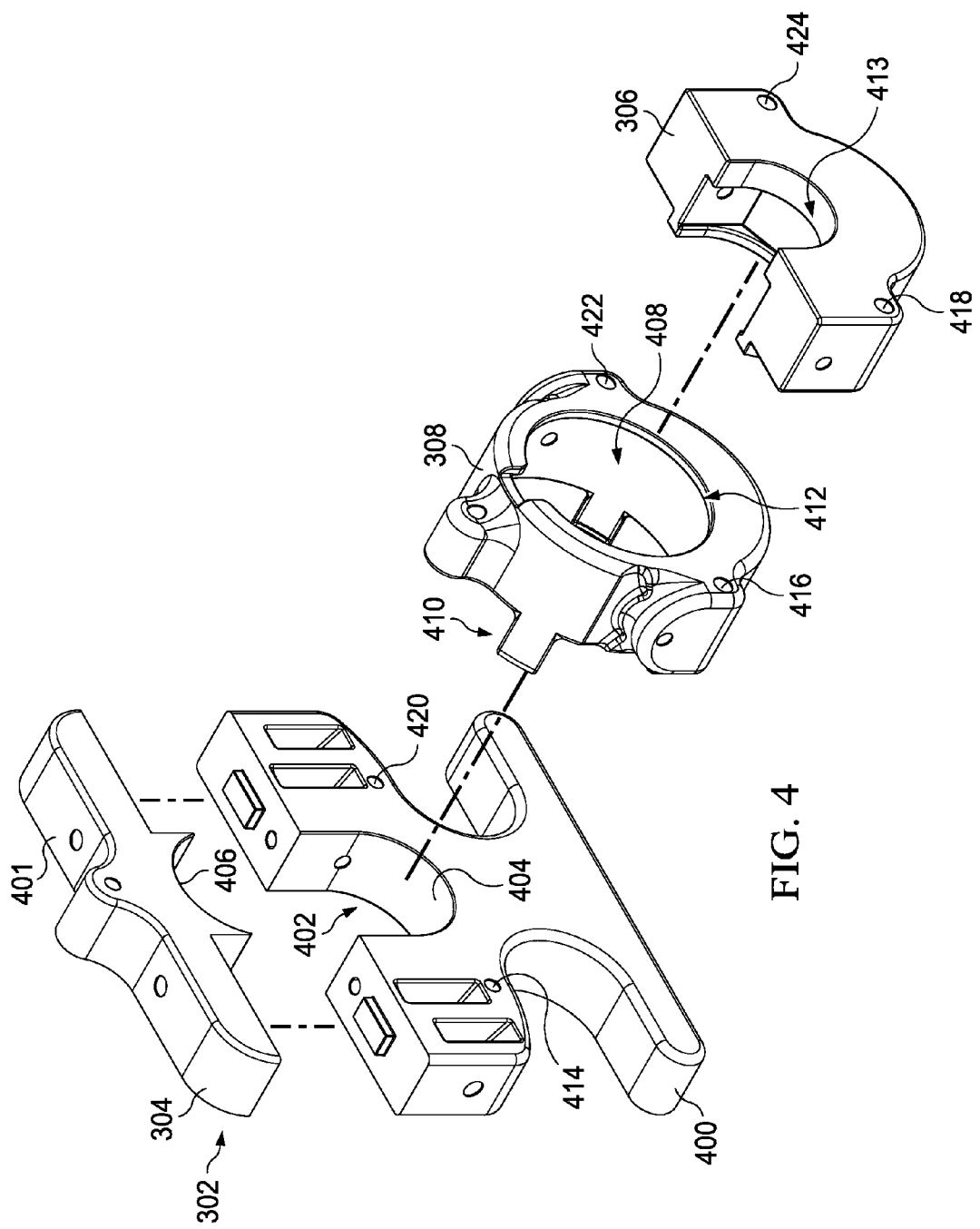
FIG. 4 is an illustration of an exploded isometric side view of a support structure in accordance with an illustrative embodiment.

With reference now to FIG. 4, an illustration of an exploded isometric side view of support structure 302 from FIG. 3 is depicted in accordance with an illustrative embodiment. As depicted in FIG. 4, first bracket 304 may be comprised of first part 400 and second part 401. First part 400 and second part 401 may be attached to each other to form first bracket 304 and channel 402 within first bracket 304.

Channel 402 may be formed by cavity 404 in first part 400 and cavity 406 in second part 401. Channel 402 may be configured to hold a fitting, such as, for example, first fitting 202 in FIG. 2. Second bracket 306 may have cavity 413 configured to hold a fitting such as, for example, second fitting 204 in FIG. 2.

Further, third bracket 308 may have channel 408 configured to hold a retractable sleeve, such as retractable sleeve 206 in FIG. 2. As depicted, third bracket 308 has plurality of clips 410 and lip 412 configured to hold the retractable sleeve in place. In this manner, movement of third bracket 308 may cause movement of the retractable sleeve.

As depicted, guide 314 from FIG. 3 may be configured to pass through opening 414 in first bracket 304, opening 416 in third bracket 308, and opening 418 in second bracket 306. Further, guide 316 from FIG. 3 may be configured to pass through opening 420 in first bracket 304, opening 422 in third bracket 308, and opening 424 in second bracket 306. In this manner, first bracket 304, second bracket 306, and third bracket 308 may all be held in alignment with each other.

Figure 5:
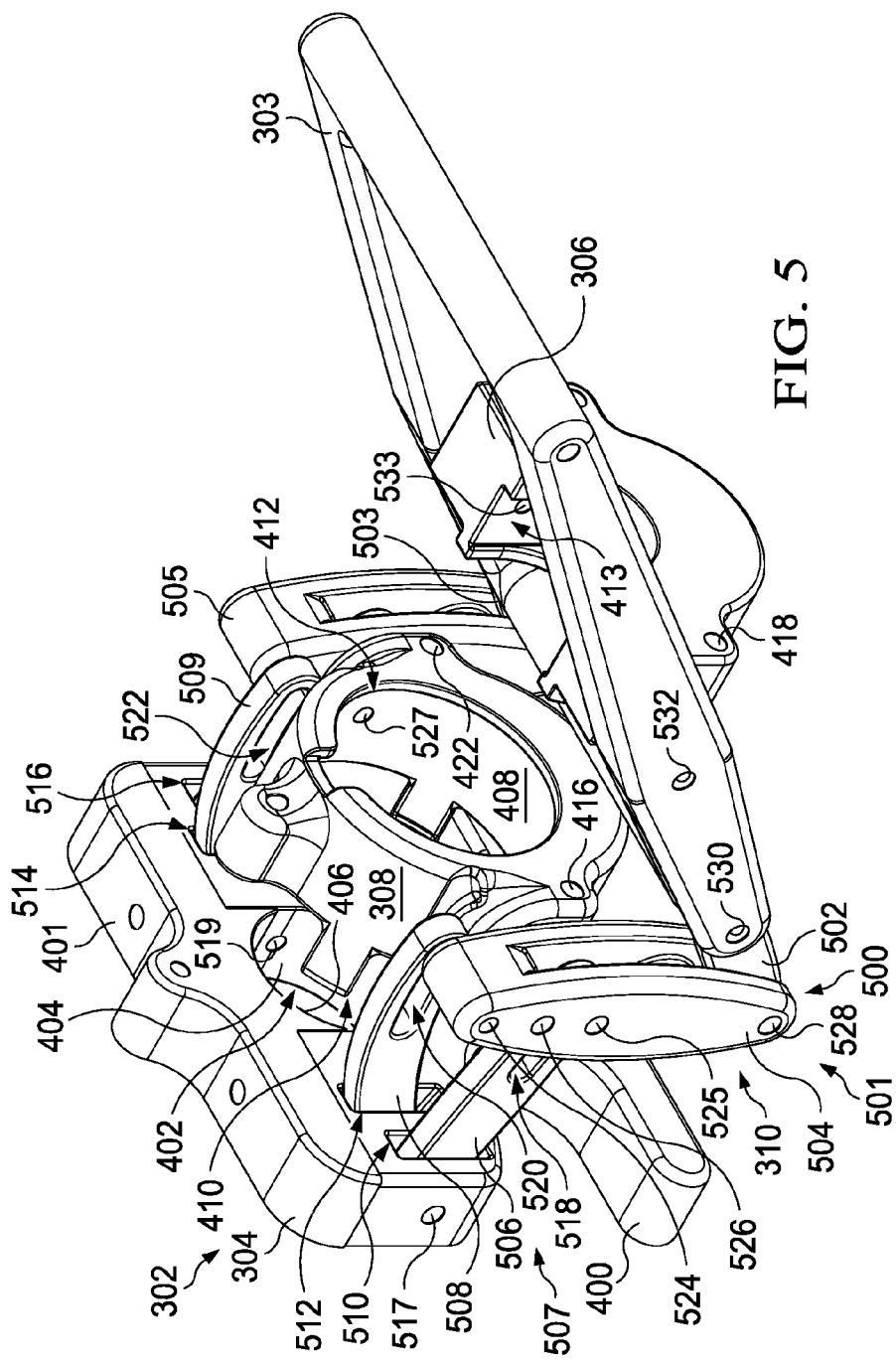
FIG. 5 is an illustration of an isometric side view of a support structure, a lever, and a retraction mechanism for a coupling control system in accordance with an illustrative embodiment.

Turning now to FIG. 5, an illustration of an isometric side view of a portion of coupling control system 300 is depicted in accordance with an illustrative embodiment. In this illustrative example, platform 312 and set of guides 311 are not shown such that the components of retraction mechanism 310 may be more clearly seen. As depicted, retraction mechanism 310 includes set of linkage members 500, set of retracting members 501, and slotted members 507.

Set of linkage members 500 includes linkage member 502 and linkage member 503. Set of retracting members 501 includes retracting member 504 and retracting member 505. Further, slotted members 507 include slotted member 506, slotted member 508, slotted member 509, and another slotted member (not shown in this view). Slotted member 508 and slotted member 509 may be an example of one implementation for first set of slotted members 148 in FIG. 1. Further, slotted member 506 and the other slotted member (not shown) may be examples of one implementation for second set of slotted members 150 in FIG. 1.

In this illustrative example, slotted member 506 and slotted member 508 are positioned within slot 510 and slot 512, respectively. These slotted members are pivotably connected to first bracket 304 at connection 517. Further, slotted member 509 and the other slotted member (not shown in this view) are positioned within slot 514 and slot 516, respectively. These slotted members are pivotably connected to first bracket 304 at connection 519.

As depicted, slotted member 506 may have slot 518, slotted member 508 may have slot 520, and slotted member 509 may have slot 522. Retracting member 504 is configured to be slidably connected to slotted member 506 and slotted member 508 through connection 525 within slot 518 and connection 524 within slot 520, respectively. Retracting member 505 may be slidably connected to slotted member 509 and the other slotted member (not shown in this view) in a similar manner.

Additionally, retracting member 504 may be pivotably connected to third bracket 308 at connection 526. Retracting member 504 may be also pivotably connected to third bracket 308 at connection 527.

In this illustrative example, linkage member 502 may be connected to retracting member 504 at connection 528, and linkage member 503 may be pivotably connected to retracting member 505 by a similar connection (not shown in this view). Linkage member 502 may be pivotably connected to handle 303 at connection 530, and linkage member 503 may be pivotably connected to handle 303 at a similar connection (not shown in this view). Further, handle 303 may be pivotably connected to second bracket 306 at connection 532 and at connection 533.

Figure 6:
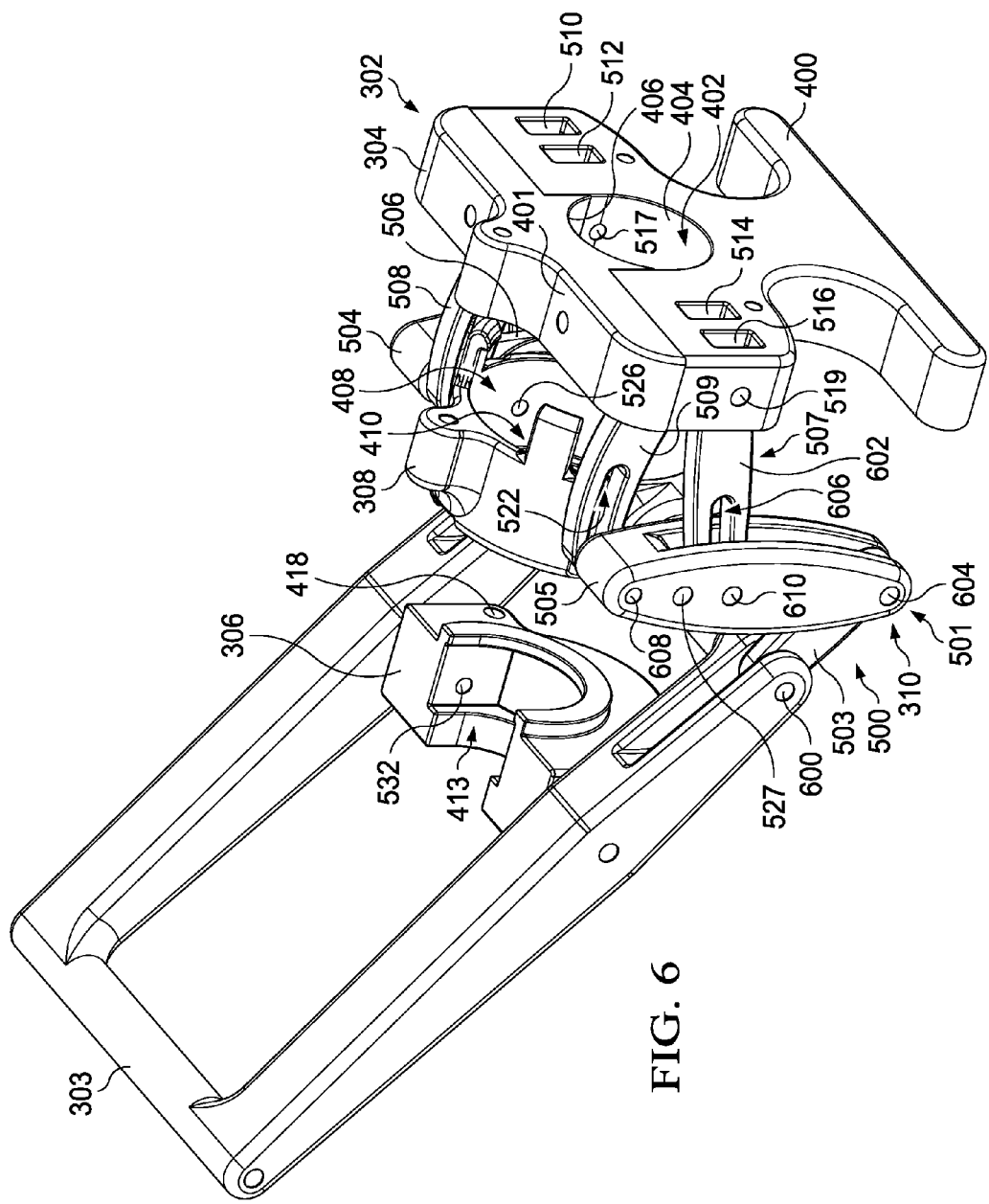
FIG. 6 is an illustration of an opposite isometric side view of a support structure, a lever, and a retraction mechanism for a coupling control system in accordance with an illustrative embodiment.

With reference now to FIG. 6, an illustration of an opposite isometric side view of a support structure, a lever, and a retraction mechanism for coupling control system 300 from FIG. 5 is depicted in accordance with an illustrative embodiment. In this illustrative example, platform 312 and set of guides 311 are not shown such that the components of retraction mechanism 310 may be more clearly seen.

As depicted, linkage member 503 may be pivotably connected to handle 303 at connection 600. Further, linkage member 503 may be pivotably connected to retracting member 505 at connection 604.

Retracting member 505 may be slidably connected to slotted member 509 by connection 608 through slot 522 in slotted member 509. Further, slotted member 602 may be seen in this view. Slotted member 602 may have slot 606. Retracting member 505 may be slidably connected to slotted member 602 by connection 610 through slot 606 in slotted member 602.

Figure 7:
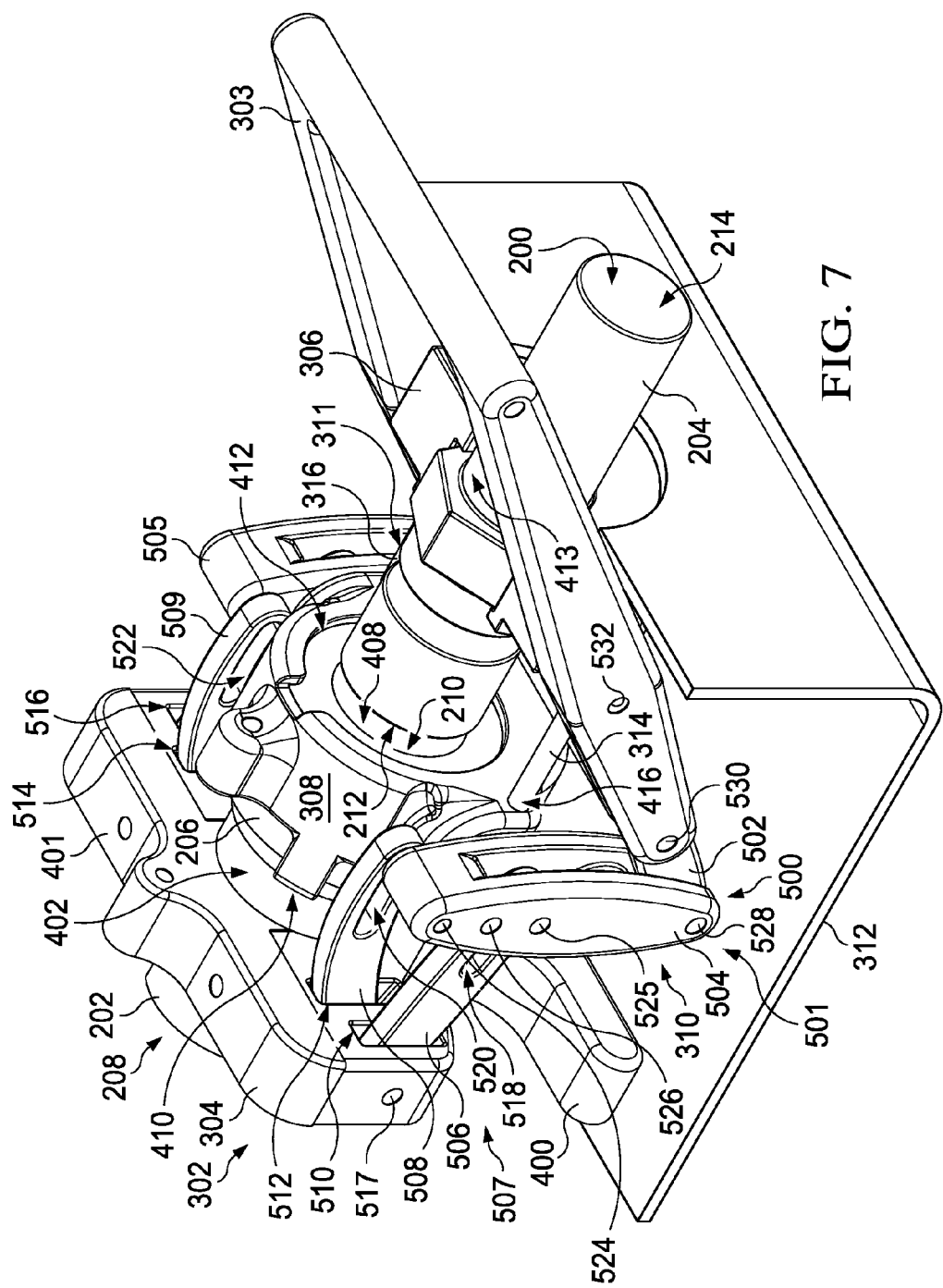
FIG. 7 is an illustration of an isometric side view of a coupling control system holding the disconnected components of a quick-release coupling in accordance with an illustrative embodiment.

With reference now to FIG. 7, an illustration of an isometric side view of coupling control system 300 holding the components of quick-release coupling 200 from FIG. 2 is depicted in accordance with an illustrative embodiment. In this illustrative example, first bracket 304 of support structure 302 holds first fitting 202. Second bracket 306 of support structure 302 holds second fitting 204. Third bracket 308 of support structure 302 holds retractable sleeve 206. As depicted, second fitting 204 is not connected to first fitting 202 in this illustrative example.

Figure 8:
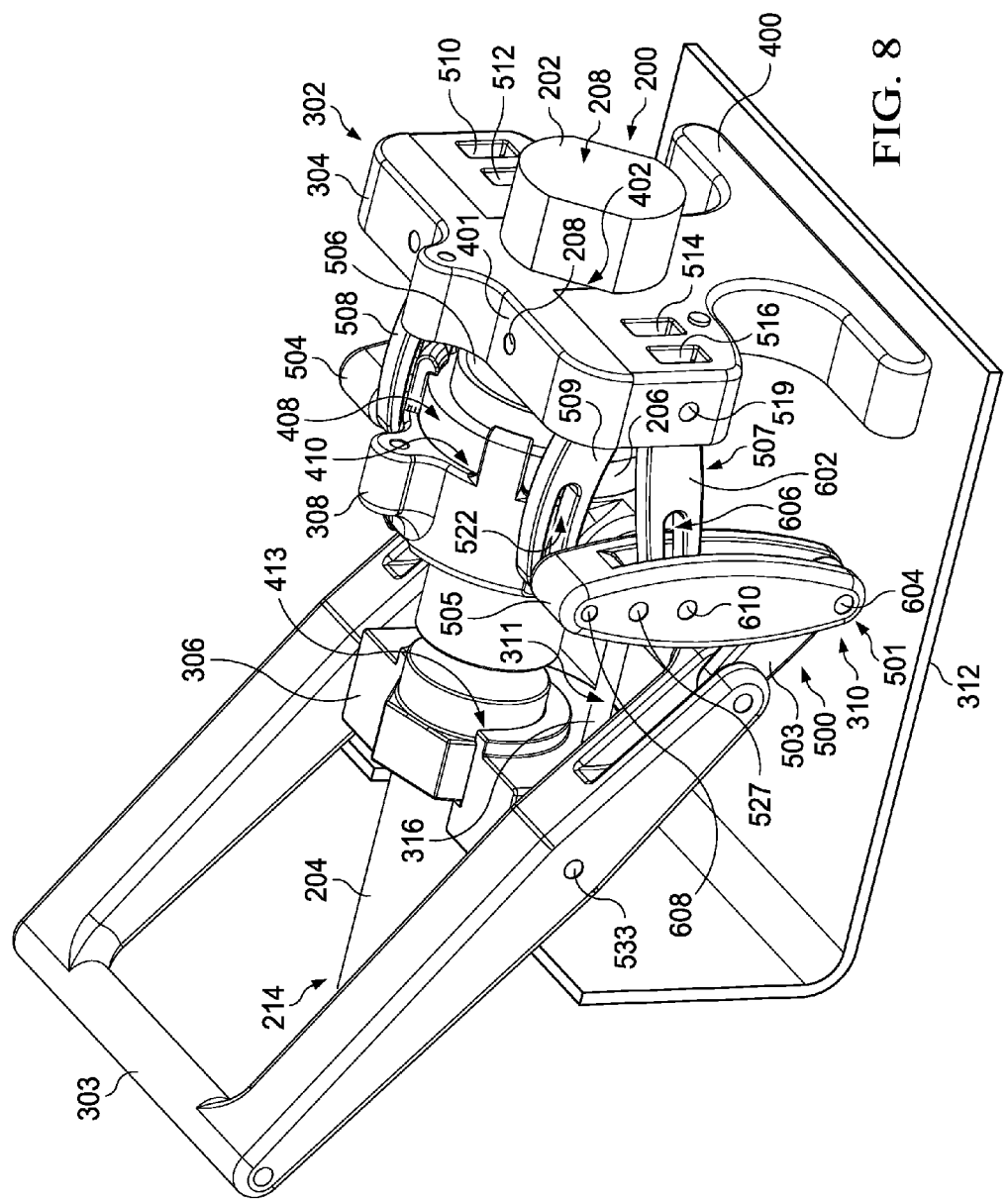
FIG. 8 is an illustration of an opposite isometric side view of a coupling control system holding the disconnected components of a quick-release coupling in accordance with an illustrative embodiment.

With reference now to FIG. 8, an illustration of an opposite isometric side view of coupling control system 300 from FIG. 7 is depicted in accordance with an illustrative embodiment. As depicted, second fitting 204 is not connected to first fitting 202 in this illustrative example.

Turning now to FIGS. 9-16, illustrations of the manner in which coupling control system 300 from FIGS. 7-8 may be operated are depicted in accordance with an illustrative embodiment. In particular, FIGS. 9-13 are illustrations of the process by which second fitting 204 may be connected to first fitting 202. Further, FIGS. 13-16 are illustrations of the process by which second fitting 204 may be disconnected from first fitting 202.

Figure 9:
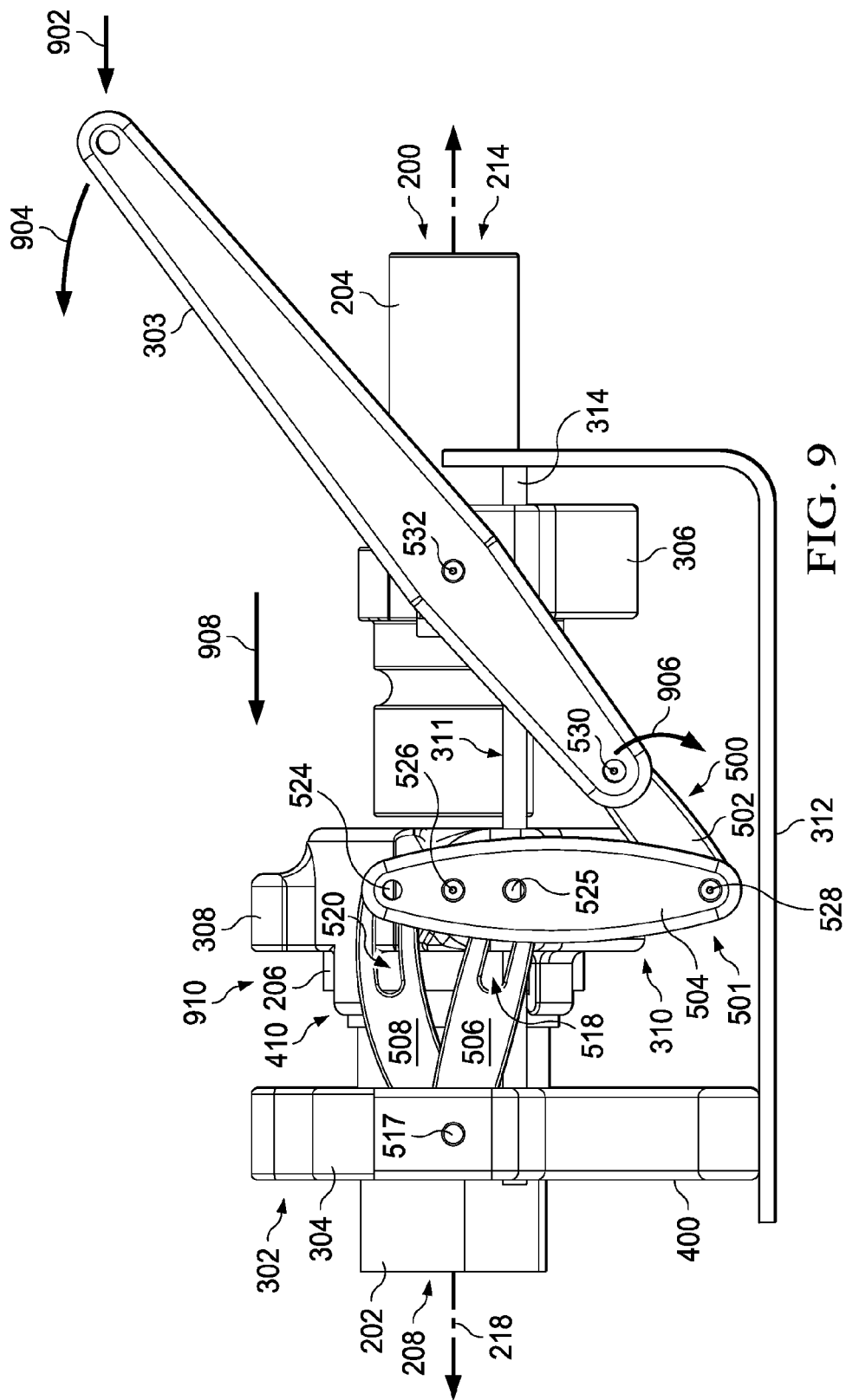
FIG. 9 is an illustration of a side view of coupling control system in accordance with an illustrative embodiment.

With reference now to FIG. 9, an illustration of a side view of coupling control system 300 is depicted in accordance with an illustrative embodiment. As depicted, support structure 302 is configured to hold second fitting 204 in alignment with longitudinal axis 218 of first fitting 202. Second fitting 204 is disconnected from first fitting 202 in this illustrative example.

Connecting second fitting 204 to first fitting 202 may be performed by operating handle 303. In particular, force 902 may be applied to handle 303 to cause handle 303 to rotate in the direction of arrow 904. Handle 303 may be rotated about at least one of connection 532 and connection 530.

Rotation of handle 303 causes rotation of linkage member 502 about connection 528 in the direction of arrow 906. Further, rotation of handle 303 causes movement of second bracket 306 along set of guides 311 in the direction of arrow 908 relative to first bracket 304. Movement of second bracket 306 in the direction of arrow 908 may cause movement of second fitting 204 held by second bracket 306 in the direction of arrow 908 towards first fitting 202 and retractable sleeve 206 associated with first fitting 202. Retractable sleeve 206 is in initial position 910 in this illustrative example.

Figure 10:
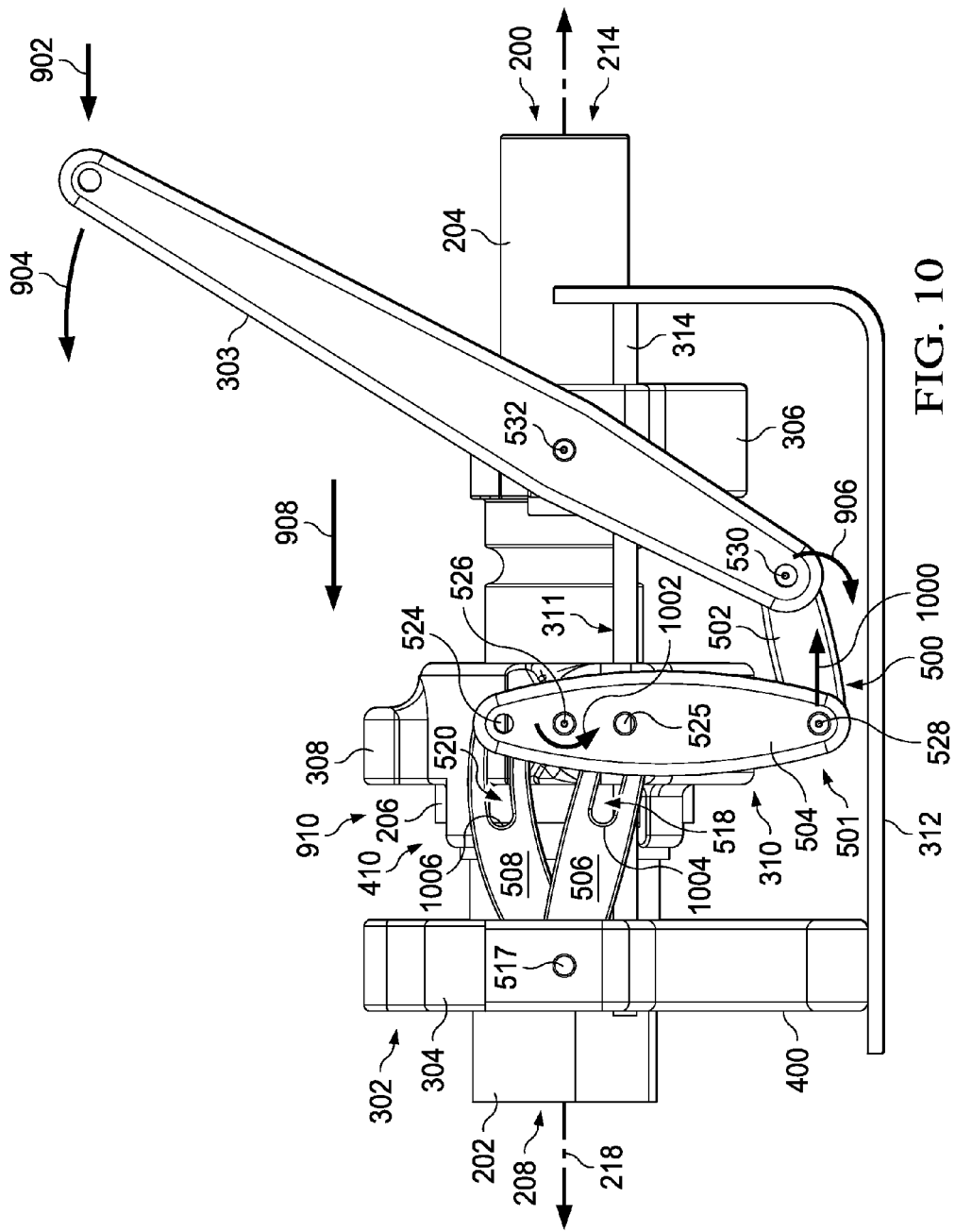
FIG. 10 is another illustration of a side view of coupling control system in accordance with an illustrative embodiment.

Turning now to FIG. 10, another illustration of a side view of coupling control system 300, the rotation of handle 303 in the direction of arrow 904 described in FIG. 9 has caused second fitting 204 to move towards first fitting 202. In particular, second fitting 204 has been moved up to retractable sleeve 206. As depicted, retractable sleeve 206 has remained in initial position 910. While retractable sleeve 206 remains in initial position 910, second fitting 204 may not be further inserted into first fitting 202.

Continued application of force 902 and thereby, further rotation of handle 303 in the direction of arrow 904 causes further rotation of linkage member 502 in the direction of arrow 906. Additionally, further rotation of handle 303 in the direction of arrow 904 may also cause linkage member 502 to translate in the direction of arrow 1000. Translation of linkage member 502 in the direction of arrow 1000 may cause rotation of retracting member 504 in the direction of arrow 1002.

In this illustrative example, retracting member 504 is positioned at the end (not shown in this view) of slot 518 opposite of end 1004 of slot 518 and at the end (not shown in this view) of slot 520 opposite of end 1006 of slot 520. As a result of retracting member 504 being positioned at the end of slot 518 opposite of end 1004 of slot 518, rotation of retracting member 504 in the direction of 1002 may slide retracting member 504 within slot 520 towards end 1006 of slot 520.

This sliding causes third bracket 308 to be moved in the direction of arrow 908. Movement of third bracket 308 in the direction of arrow 908 retracts retractable sleeve 206 in the direction of arrow 908.

Figure 11:
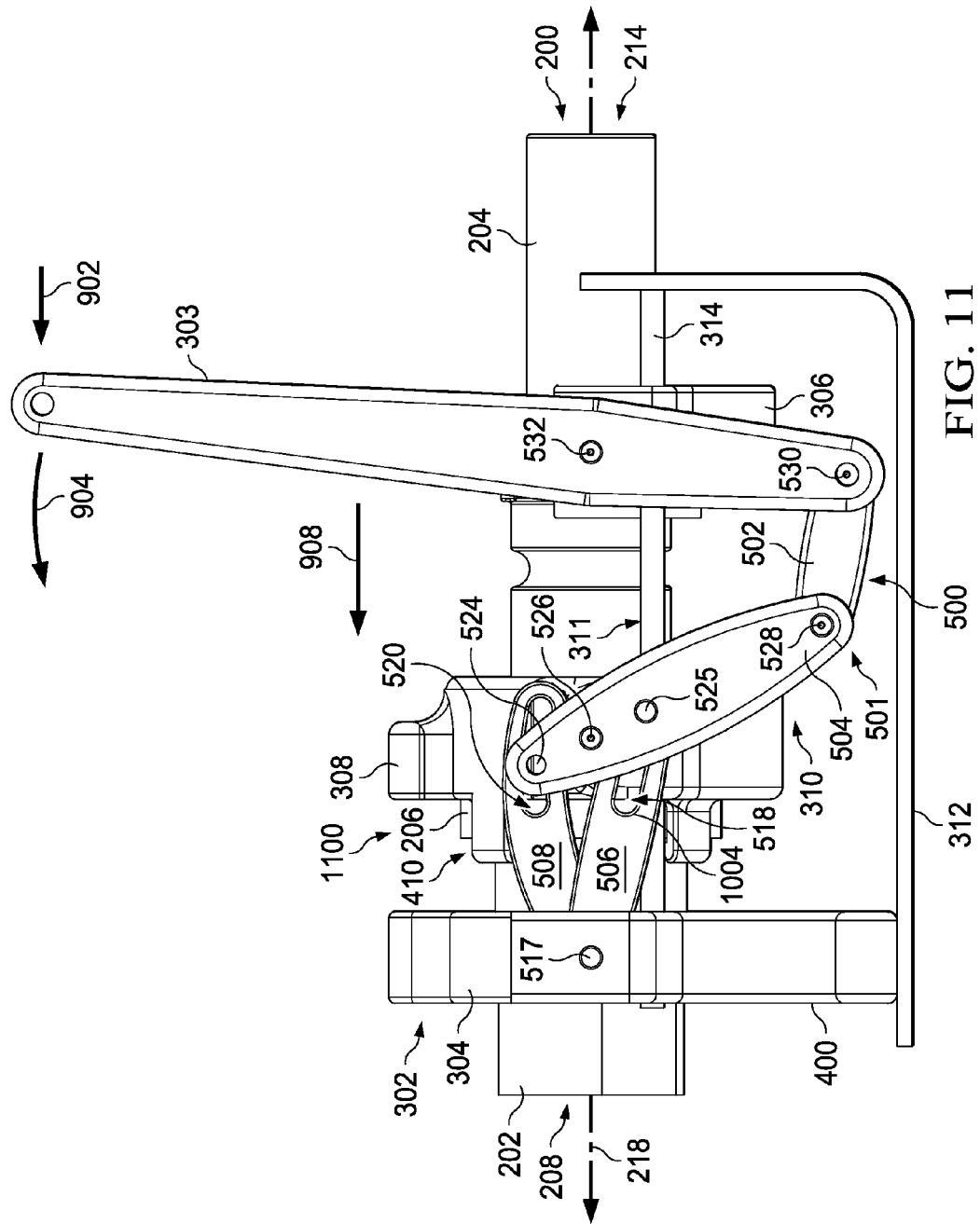
FIG. 11 is another illustration of a side view of coupling control system in accordance with an illustrative embodiment.

With reference now to FIG. 11, another illustration of a side view of coupling control system 300, retractable sleeve 206 has been retracted to retracted position 1100. With retractable sleeve 206 in retracted position 1100, continued application of force 902 may cause further rotation of handle 303 and the movement of second fitting 204 into first fitting 202. In particular, second fitting 204 may be further moved in the direction of arrow 908 such that second fitting 204 may be connected to first fitting 202.

Figure 12:
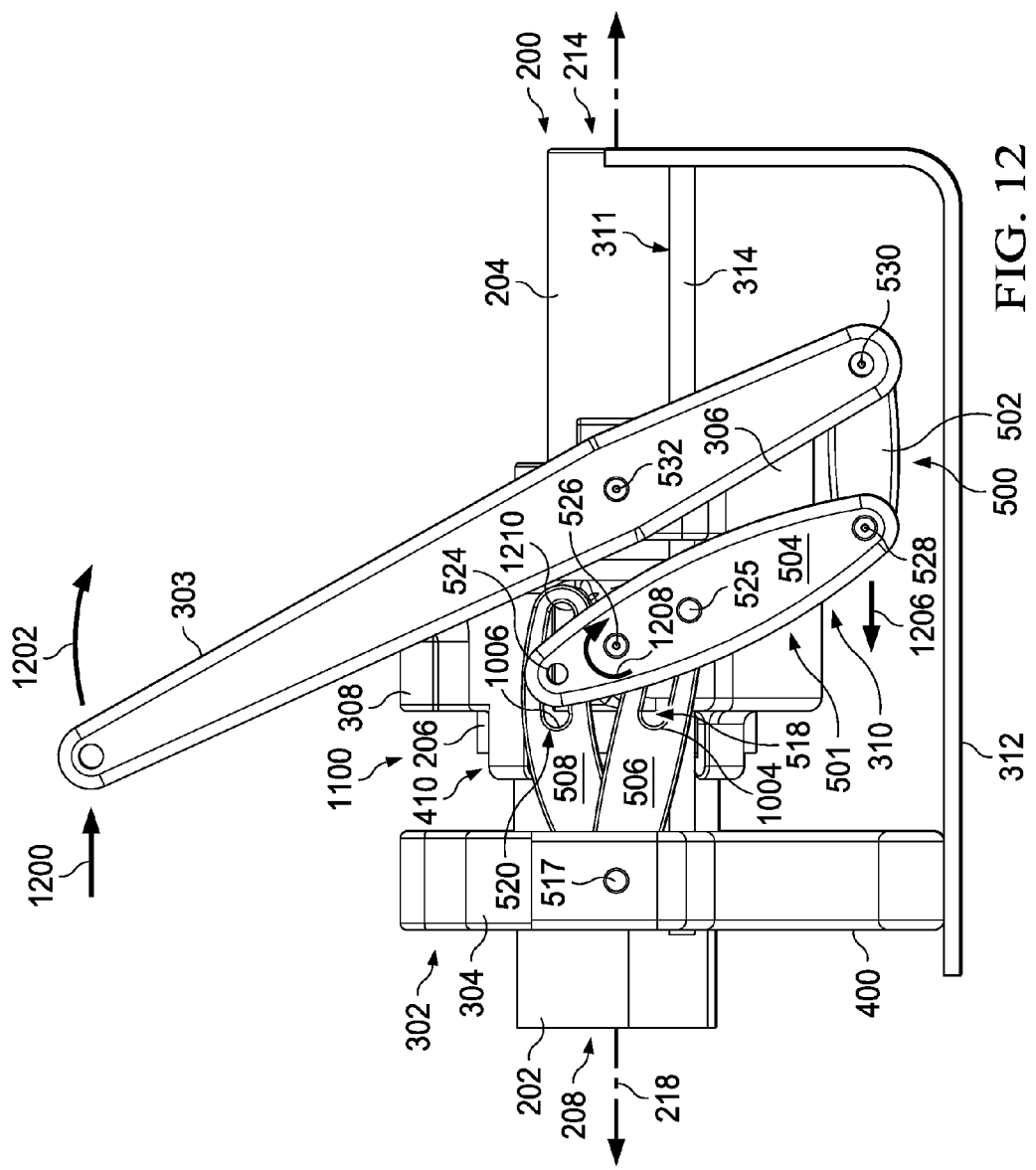
FIG. 12 is another illustration of a side view of coupling control system in accordance with an illustrative embodiment.

Turning now to FIG. 12, another illustration of a side view of coupling control system 300, second fitting 204 has been fully inserted into first fitting 202 and connected to first fitting 202. Once second fitting 204 has been connected to first fitting 202, this connection may be locked in place by retractable sleeve 206 returning to initial position 910 from FIG. 9.

Removing the application of force 902 from FIGS. 9-11 allows retractable sleeve 206 to be biased back towards initial position 910 from FIG. 9. For example, one or more springs associated with retractable sleeve 206 may cause retractable sleeve 206 to move back to initial position 910. This biasing of retractable sleeve 206 may exert force 1200 on handle 303 that causes handle 303 to rotate in the direction of arrow 1202.

Rotation of handle 303 in the direction of arrow 1202 causes translation of linkage member 502 in the direction of arrow 1206, which, in turn, causes the rotation of retracting member 504 in the direction of arrow 1208. In this manner, retracting member 504 may be pulled back to initial position 910.

Figure 13:
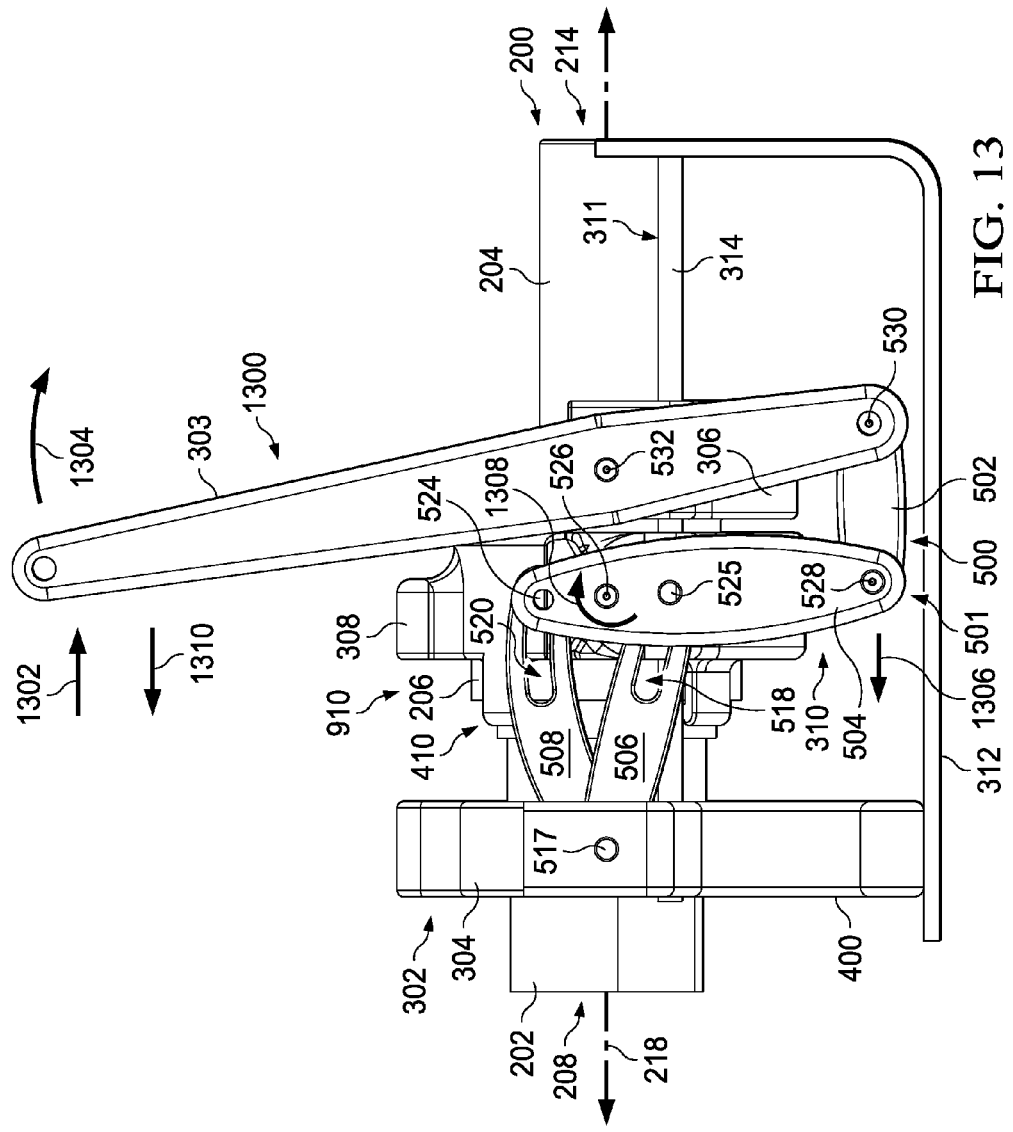
FIG. 13 is another illustration of a side view of coupling control system in accordance with an illustrative embodiment.

In FIG. 13, another illustration of a side view of coupling control system 300, retractable sleeve 206 has been moved back into initial position 910. With retractable sleeve 206 in initial position 910, the connection between second fitting 204 and first fitting 202 may be locked. As depicted, handle 303 has moved to neutral position 1300. Handle 303 may remain in neutral position 1300 until handle 303 is operated. For example, handle 303 may be operated to disconnect second fitting 204 from first fitting 202.

Disconnecting second fitting 204 from first fitting 202 requires that retractable sleeve 206 once again be retracted. Operating handle 303 may include applying force 1302 to handle 303 such that handle 303 rotates in the direction of arrow 1304.

Rotation of handle 303 in the direction of arrow 1304 may cause translation of linkage member 502 in the direction of arrow 1306. This translation may cause the rotation of retracting member 504 in the direction of arrow 1308. Further, rotation of retracting member 504 in the direction of arrow 1308, because retracting member 504 is positioned at the end (not shown in this view) of slot 520 opposite of end 1006 of slot 520, causes retractable sleeve 206 to be retracted in the direction of arrow 1310.

Figure 14:
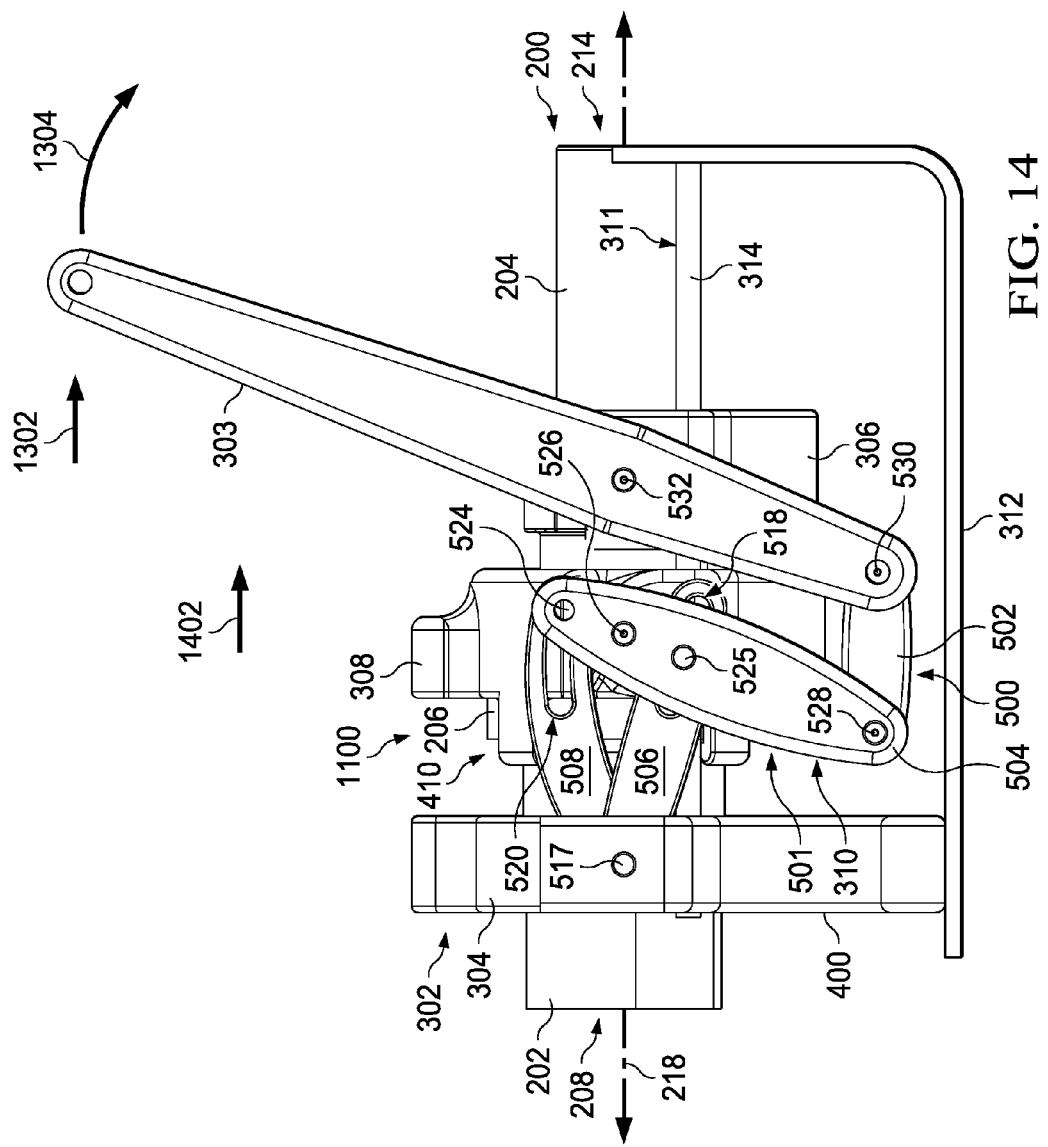
FIG. 14 is another illustration of a side view of coupling control system in accordance with an illustrative embodiment.

With reference now to FIG. 14, another illustration of a side view of coupling control system 300, retractable sleeve 206 has been retracted to retracted position 1100. This retraction of retractable sleeve 206 allows second fitting 204 to be disconnected from first fitting 202. In particular, the continued application of force 1302 on handle 303 causes the further rotation of handle 303 in the direction of arrow 1304. The further rotation of handle 303 in the direction of arrow 1304 causes second fitting 204 to be moved away from first fitting 202 in the direction of arrow 1402.

Figure 15:
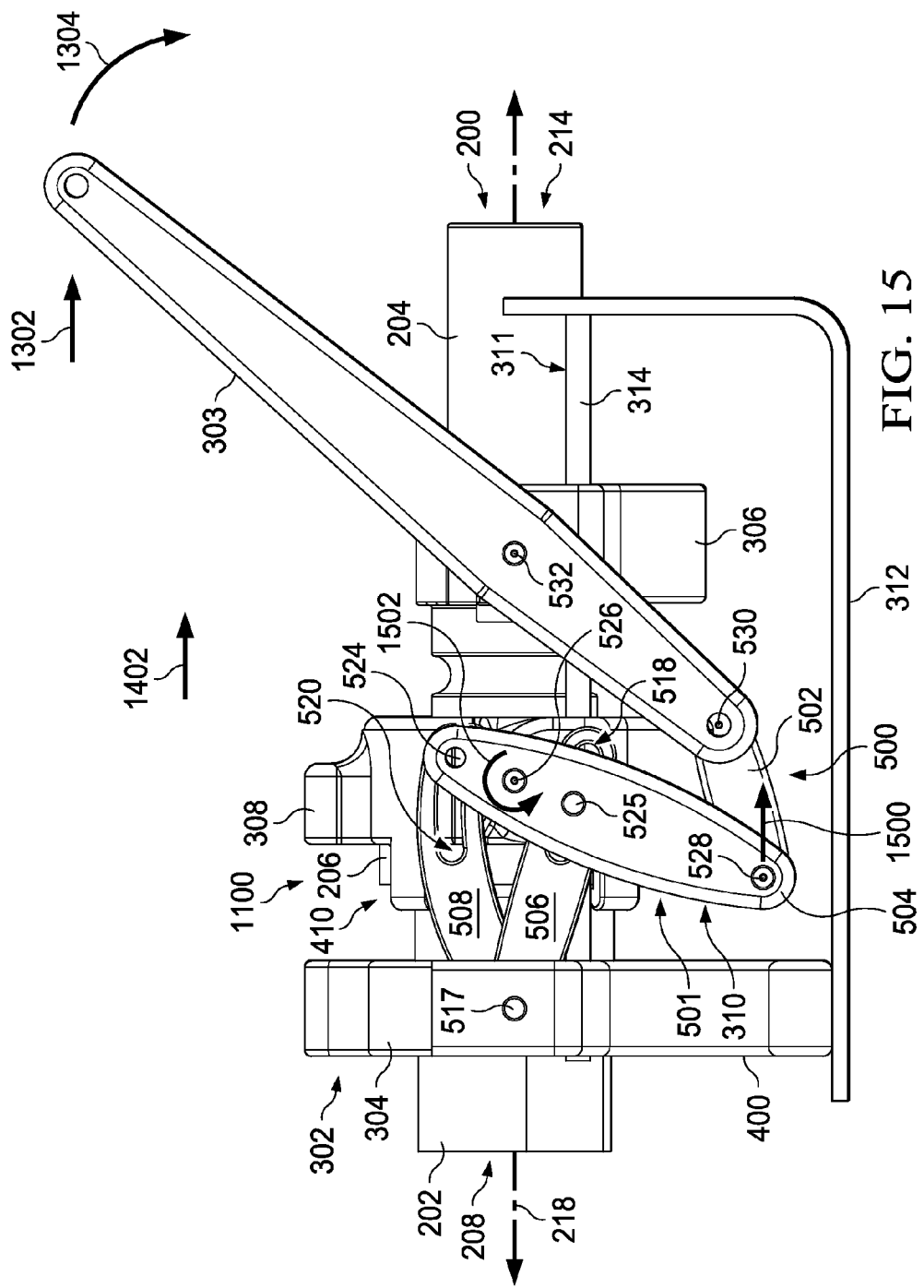
FIG. 15 is another illustration of a side view of coupling control system in accordance with an illustrative embodiment.

Turning now to FIG. 15, another illustration of a side view of coupling control system 300, second fitting 204 has been moved away from first fitting 202. Continued application of force 1302, and thereby, the further rotation of handle 303 in the direction of arrow 1304, causes further movement of second fitting 204 in the direction of arrow 1402.

Additionally, the further rotation of handle 303 causes the translation of linkage member 502 in the direction of arrow 1500. Translation of linkage member 502 in the direction of arrow 1500 causes the rotation of retracting member 504 in the direction of arrow 1502. This rotation of retracting member 504 allows retractable sleeve 206 to return to initial position 910 from FIG. 9 and FIG. 13.

Figure 16:
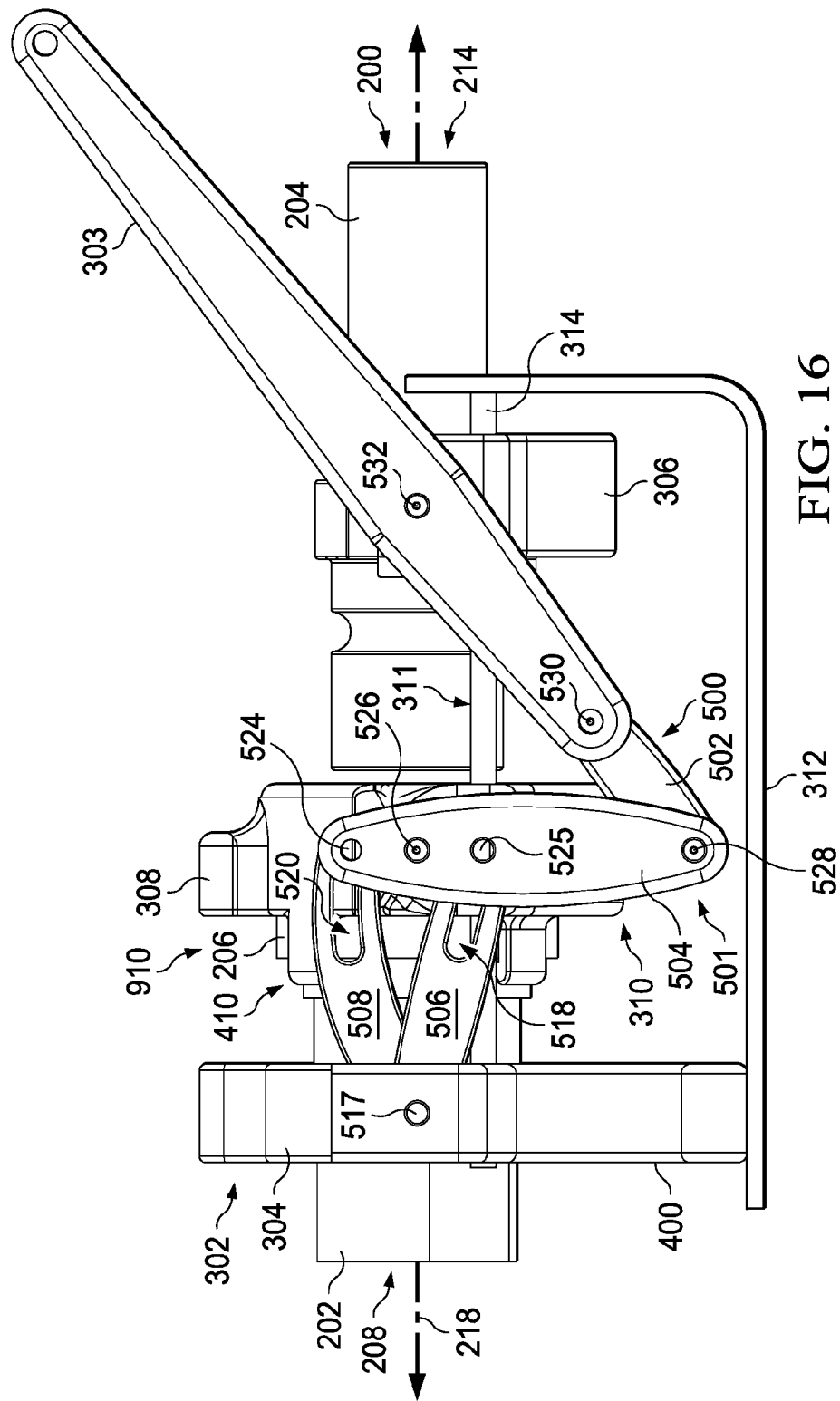
FIG. 16 is another illustration of a side view of coupling control system in accordance with an illustrative embodiment.

With reference now to FIG. 16, another illustration of a side view of coupling control system 300, second fitting 204 has been fully disconnected from first fitting 202 and moved away from first fitting 202. Further, retractable sleeve 206 has returned to initial position 910.

The illustrations of quick-release coupling 200 in FIG. 2 and coupling control system 300 in FIGS. 3-16 are not meant to imply physical or architectural limitations to the manner in which an illustrative embodiment may be implemented. Other components in addition to or in place of the ones illustrated may be used. Some components may be optional.

The different components shown in FIGS. 2-16 may be illustrative examples of how components shown in block form in FIG. 1 can be implemented as physical structures. Additionally, some of the components in FIGS. 2-16 may be combined with components in FIG. 1, used with components in FIG. 1, or a combination of the two.

Figure 17:
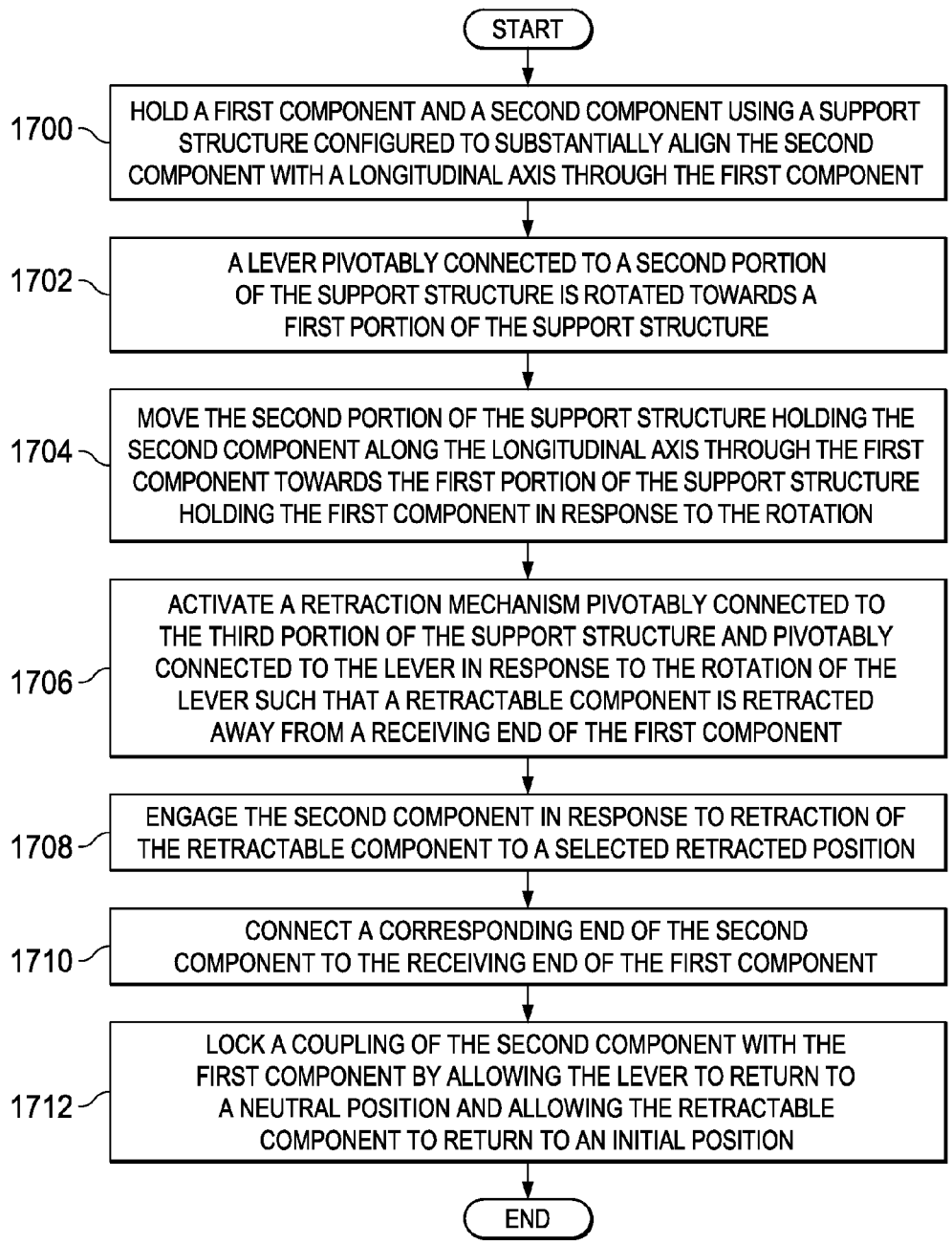
FIG. 17 is an illustration of a process for connecting components of a quick-release coupling in the form of a flowchart in accordance with an illustrative embodiment.

With reference now to FIG. 17, an illustration of a process for connecting components of a quick-release coupling is depicted in the form of a flowchart in accordance with an illustrative embodiment. The process illustrated in FIG. 17 may be implemented using coupling control system 100 in FIG. 1. This process may be used to connect, for example, without limitation, second component 106 to first component 104 from FIG. 1.

The process begins by holding a first component and a second component using a support structure configured to substantially align the second component with a longitudinal axis through the first component (operation 1700). In operation 1700, the support structure is also used to hold a retractable component associated with the first component.

The second component may be configured to be partially inserted within a channel in the first component at a receiving end of the first component and then connected to the first component. The position of the retractable component relative to the receiving end determines whether a corresponding end of the second component is allowed to connect to the receiving end of the first component.

In one illustrative example, the support structure may include a first portion configured to hold the first component, a second portion configured to hold the second component, and a third portion configured to hold the retractable component. The first portion, second portion, and third portion of the support structure may take the form of, for example, without limitation, a first bracket, a second bracket, and a third bracket, respectively.

Next, a lever pivotably connected to the second portion of the support structure is rotated towards the first portion of the support structure (operation 1702). This rotation may be performed by a human operator or a robotic operator, depending on the implementation. The second portion of the support structure holding the second component is moved along the longitudinal axis through the first component towards the first portion of the support structure holding the first component in response to the rotation (operation 1704).

Further, a retraction mechanism pivotably connected to the third portion of the support structure and pivotably connected to the lever is activated in response to the rotation of the lever such that the retractable component is retracted away from the receiving end of the first component (operation 1706). In operation 1706, activation of the retraction mechanism occurs once the second component encounters a locking mechanism at the receiving end of the first component during movement of the second component in operation 1704.

The locking mechanism may take the form of, for example, without limitation, a ball detent system comprised of a plurality of ball detents located at the receiving end of the first component. When the retractable component is in an initial position that is a non-retracted position, these ball detents may prevent the second component from being connected to the first component. However, when the retractable component is retracted to a selected retracted position, the ball detents may be moved such that the second component may be allowed to slide into the channel of the first component and be connected to the first component.

In this manner, the locking mechanism may engage the second component in response to retraction of the retractable component to the selected retracted position (operation 1708). The corresponding end of the second component may then be connected to the receiving end of the first component (operation 1710). In operation 1710, the connection occurs when the second component is inserted far enough into the channel of the first component to allow the ball detents to engage the second component. The ball detents may be considered engaged with the second component when the ball detents are allowed to fall into a groove around the second component.

Thereafter, the connection between the second component with the first component may be locked by allowing the lever to return to a neutral position and allowing the retractable component to return to the initial position (operation 1712), with the process terminating thereafter. In operation 1712, removing the force causing the lever to be rotated causes a biasing mechanism associated with the retractable component to move the retractable component back into the non-retracted position, in turn, causing the lever to be moved into a neutral position.

Figure 18:
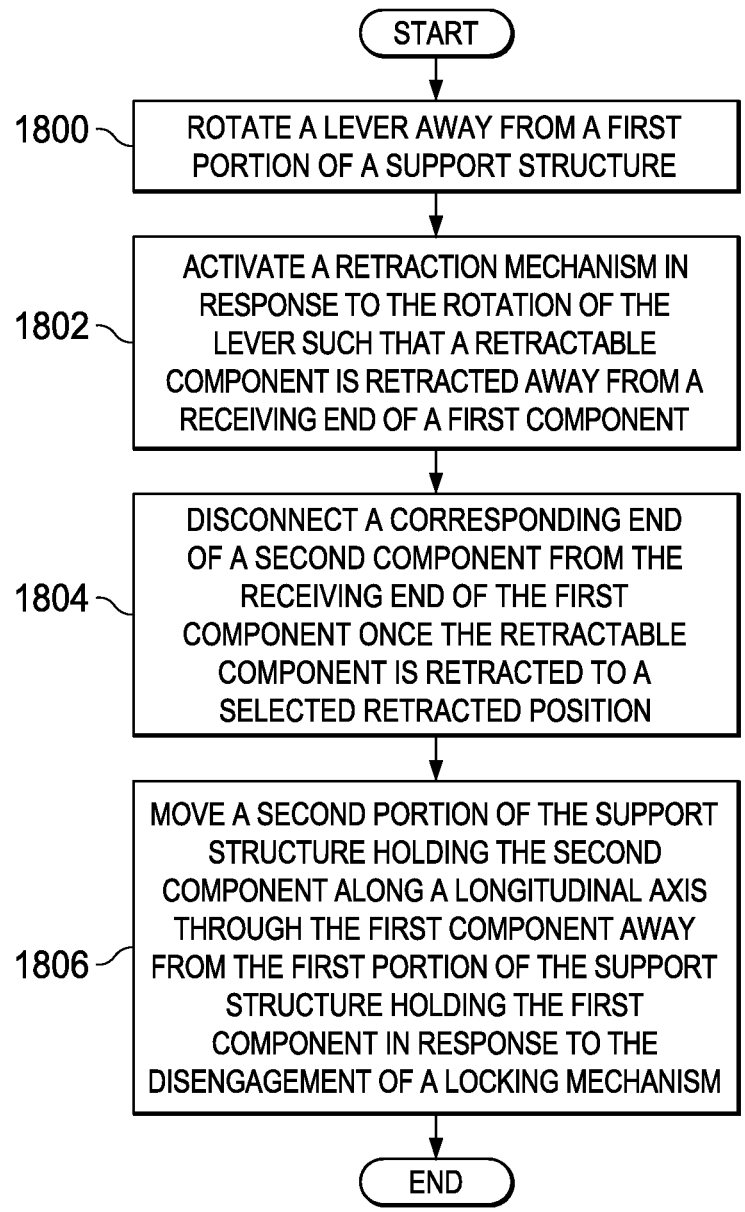
FIG. 18 is an illustration of a process for disconnecting components of a quick-release coupling in the form of a flowchart in accordance with an illustrative embodiment.

With reference now to FIG. 18, an illustration of a process for disconnecting components of a quick-release coupling is depicted in the form of a flowchart in accordance with an illustrative embodiment. The process illustrated in FIG. 18 may be implemented using coupling control system 100 in FIG. 1. This process may be used to disconnect, for example, without limitation, second component 106 from first component 104 from FIG. 1. In particular, this process may be used to undo the connection described by the process in FIG. 17.

The process begins by rotating the lever away from the first portion of the support structure (operation 1800). In operation 1800, the lever may be rotated from the neutral position described in operation 1712 in a direction away from the first portion of the support structure. In operation 1800, the rotation of the lever exerts a force on the second portion of the support structure holding the second component in a direction along the longitudinal axis away from the first component.

However, when the retractable component is in an initial position that is a non-retracted position, the ball detents that are engaged with the second component keep the connection between the second component and the first component locked. In other words, when the ball detents are engaged with the second component, these ball detents prevent the second component from being disconnected from the first component. Alternatively, when the retractable component is retracted to a selected retracted position, the ball detents may be disengaged from the second component such that the second component may be allowed to slide out of the channel of the first component and be disconnected from the first component.

Thus, the retraction mechanism is activated in response to the rotation of the lever such that the retractable component is retracted away from the receiving end of the first component (operation 1802). This retraction of the retractable component allows the ball detents to disengage from the second component.

In this manner, the corresponding end of the second component may be disconnected from the receiving end of the first component once the retractable component is retracted to the selected retracted position (operation 1804). The second portion of the support structure holding the second component is moved along the longitudinal axis through the first component away from the first portion of the support structure holding the first component in response to the disengagement of the locking mechanism (operation 1806), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Illustrative embodiments of the disclosure may be described in the context of aircraft manufacturing and service method 1900 as shown in FIG. 19 and aircraft 2000 as shown in FIG. 20. Turning first to FIG. 19, an illustration of an aircraft manufacturing and service method in the form of a block diagram is depicted in accordance with an illustrative embodiment. During pre-production, aircraft manufacturing and service method 1900 may include specification and design 1902 of aircraft 2000 in FIG. 20 and material procurement 1904.

During production, component and subassembly manufacturing 1906 and system integration 1908 of aircraft 2000 in FIG. 20 takes place. Thereafter, aircraft 2000 in FIG. 20 may go through certification and delivery 1910 in order to be placed in service 1912. While in service 1912 by a customer, aircraft 2000 in FIG. 20 is scheduled for routine maintenance and service 1914, which may include modification, reconfiguration, refurbishment, and other maintenance or service.

Each of the processes of aircraft manufacturing and service method 1900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 20, an illustration of an aircraft in the form of a block diagram is depicted in which an illustrative embodiment may be implemented. In this example, aircraft 2000 is produced by aircraft manufacturing and service method 1900 in FIG. 19 and may include airframe 2002 with a plurality of systems 2004 and interior 2006. Examples of systems 2004 include one or more of propulsion system 2008, electrical system 2010, hydraulic system 2012, and environmental system 2014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1900 in FIG. 19.

In one illustrative example, components or subassemblies produced in component and subassembly manufacturing 1906 in FIG. 19 may be fabricated or manufactured in a manner similar to components or subassemblies produced while aircraft 2000 is in service 1912 in FIG. 19. As yet another example, one or more apparatus embodiments, method embodiments, or a combination thereof may be utilized during production stages, such as component and subassembly manufacturing 1906 and system integration 1908 in FIG. 19. One or more apparatus embodiments, method embodiments, or a combination thereof may be utilized while aircraft 2000 is in service 1912 and/or during maintenance and service 1914 in FIG. 19. The use of a number of the different illustrative embodiments may substantially expedite the assembly of and/or reduce the cost of aircraft 2000.

Thus, the illustrative embodiments provide a method and apparatus for quickly connecting and disconnecting the components of quick-release couplings. In one illustrative embodiment, a lever may be pivotably connected to a support structure, which is configured to both hold a first component and a retractable component associated with the first component and substantially align a second component with a longitudinal axis through the first component. The lever may be rotated. In response to the rotation of the lever, a retraction mechanism configured to retract the retractable component away from a receiving end of the first component may be activated. The rotation of the lever and the retraction of the retractable component allow a coupling of the second component with the first component to be controlled.

In this manner, operation of a single lever allows the primary components of a quick-release coupling to be quickly connected or quickly disconnected. A single motion of the lever may be used retract the retractable component, connects the second component to the first component, and locks the connection between the second component and the first component. Further, a single motion of the lever may be used to retract the retractable component, unlock the connection between the second component and the first component, and disconnect the second component from the first component.

The coupling control system provided by the illustrative embodiments, such as coupling control system 100 in FIG. 1 and coupling control system 300 in FIG. 3-16, reduces the effort needed to connect and/or disconnect of the components of a quick-release coupling. The lever of the coupling control system may be operated by a single human operator or, in some cases, by a single robotic operator.

The amount of effort needed to operate the lever to connect and/or disconnect the components of a quick-release coupling may be reduced as compared to the amount of effort needed to perform these operations without using the coupling control system. Further, the coupling control system provided by the illustrative embodiments may reduce the overall time needed to connect and/or disconnect the components of quick-release couplings.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a support structure comprising:
        a first portion configured to hold a first component;
        a second portion configured to hold a second component in alignment with a longitudinal axis through the first component; and
        a third portion configured to hold a retractable component associated with the first component;
    a retraction mechanism pivotably connected to a lever and to the third portion of the support structure; and
    the lever pivotably connected to the second portion of the support structure, wherein rotation of the lever moves the second component along the longitudinal axis and causes the retraction mechanism to retract the retractable component away from a receiving end of the first component, and wherein retraction of the retractable component away from the receiving end of the first component allows the second component to be one of connected to and disconnected from the first component.

2. The apparatus of claim 1, wherein the rotation of the lever is configured to cause the retraction mechanism to move the third portion of the support structure and the retractable component held by the third portion of the support structure relative to the first portion of the support structure such that the retractable component is retracted away from the receiving end of the first component.

3. The apparatus of claim 2, wherein retraction of the retractable component away from the receiving end of the first component allows the second component to be one of connected to the first component and disconnected from the first component at the receiving end of the first component.

4. The apparatus of claim 1, wherein the rotation of the lever activates the retraction mechanism when an end of the second component encounters a locking mechanism at the receiving end of the first component.

5. The apparatus of claim 4, wherein activation of the retraction mechanism causes the retractable component to retract until the retractable component reaches a selected position at which the locking mechanism is allowed to move from a locked state into an unlocked state.

6. The apparatus of claim 1, wherein the retraction mechanism comprises:
    a set of linkage members pivotably connected to the lever, wherein the rotation of the lever moves the set of linkage members at least one of rotationally and translationally; and
    a set of retracting members pivotably connected to the set of linkage members and pivotably connected to the third portion of the support structure at a connection.

7. The apparatus of claim 6, wherein translational movement of the set of linkage members caused by the rotation of the lever activates the retraction mechanism by causing the set of retracting members to rotate about the connection.

8. The apparatus of claim 7, wherein the retraction mechanism further comprises:
    a first set of slotted members, wherein each of the set of retracting members is slidably connected to a corresponding one of the first set of slotted members; and
    a second set of slotted members, wherein the each of the set of retracting members is slidably connected to a corresponding one of the second set of slotted members.

9. The apparatus of claim 8, wherein movement of the set of linkage members causes the set of retracting members to at least one of rotate and move relative to at least one of the first set of slotted members and the second set of slotted members.

10. The apparatus of claim 1, wherein the first portion of the support structure is a first bracket, the second portion of the support structure is a second bracket, and the third portion of the support structure is a third bracket.

11. The apparatus of claim 10, wherein the second bracket and the third bracket are configured to move relative to the first bracket along the longitudinal axis.

12. The apparatus of claim 11 further comprising:
    a platform, wherein the first bracket is configured to be fixedly connected to the platform; and
    a set of guides associated with the platform and positioned substantially parallel to the longitudinal axis, wherein the second bracket and the third bracket are configured to slide relative to the first bracket along the set of guides.

13. The apparatus of claim 1 further comprising:
a biasing system configured to bias the third portion of the support structure at least one of towards and away from the second portion of the support structure.

14. A coupling control system comprising:
a support structure comprising:
   a first bracket configured to hold a first component;
   a second bracket configured to hold a second component in alignment with a longitudinal axis through the first component; and
   a third bracket configured to hold a retractable component associated with the first component;
a lever pivotably connected to the second bracket of the support structure; and
a retraction mechanism pivotably connected to the lever and to the third bracket of the support structure, wherein rotation of the lever moves the second component along the longitudinal axis and causes the retraction mechanism to retract the retractable component away from a receiving end of the first component in which retraction of the retractable component away from the receiving end of the first component allows the second component to be one of connected to the first component and disconnected from the first component at the receiving end of the first component, and wherein retraction of the retractable component away from the receiving end of the first component allows the second component to be one of connected to and disconnected from the first component.

15. The coupling control system of claim 14, wherein the rotation of the lever is configured to cause the retraction mechanism to move the third bracket the retractable component held by the third bracket relative to the first bracket such that the retractable component is retracted away from the receiving end of the first component.

16. The coupling control system of claim 14, wherein the rotation of the lever activates the retraction mechanism when an end of the second component encounters a locking mechanism at the receiving end of the first component.

17. The coupling control system of claim 16, wherein activation of the retraction mechanism causes the retractable component to retract until the retractable component reaches a selected position at which the locking mechanism is allowed to move from a locked state into an unlocked state.

18. The coupling control system of claim 14, wherein the retraction mechanism comprises:
a set of linkage members pivotably connected to the lever, wherein the rotation of the lever moves the set of linkage members at least one of rotationally and translationally; and
a set of retracting members pivotably connected to the set of linkage members and pivotably connected to the third bracket at a connection.

19. The coupling control system of claim 18, wherein translational movement of the set of linkage members caused by the rotation of the lever activates the retraction mechanism by causing the set of retracting members to rotate about the connection.

20. The apparatus of claim 19, wherein the retraction mechanism further comprises:
a first set of slotted members, wherein each of the set of retracting members is slidably connected to a corresponding one of the first set of slotted members; and
a second set of slotted members, wherein the each of the set of retracting members is slidably connected to a corresponding one of the second set of slotted members, and wherein movement of the set of linkage members causes the set of retracting members to at least one of rotate and move relative to at least one of the first set of slotted members and the second set of slotted members.

* * * * *